(12) United States Patent
Tadaki et al.

(10) Patent No.: US 8,022,129 B2
(45) Date of Patent: Sep. 20, 2011

(54) CONJUGATED DIOLEFIN COPOLYMER RUBBER, METHOD FOR PRODUCING THE SAME, RUBBER COMPOSITION AND TIRE

(75) Inventors: Toshihiro Tadaki, Minato-ku (JP); Masahiro Shibata, Minato-ku (JP); Tamotsu Nagaoka, Minato-ku (JP); Takuo Sone, Minato-ku (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 12/531,346

(22) PCT Filed: Mar. 14, 2008

(86) PCT No.: PCT/JP2008/054824
§ 371 (c)(1),
(2), (4) Date: Sep. 15, 2009

(87) PCT Pub. No.: WO2008/114756
PCT Pub. Date: Sep. 25, 2008

(65) Prior Publication Data
US 2010/0130671 A1   May 27, 2010

(30) Foreign Application Priority Data

| Mar. 15, 2007 | (JP) | ................................. | 2007-066878 |
| Mar. 15, 2007 | (JP) | ................................. | 2007-066886 |
| Mar. 15, 2007 | (JP) | ................................. | 2007-066896 |

(51) Int. Cl.
*C08K 3/34* (2006.01)
*C08L 43/00* (2006.01)

(52) U.S. Cl. ........................ 524/492; 524/547

(58) Field of Classification Search ................... 524/492
See application file for complete search history.

(56) References Cited

U.S. PATENT DOCUMENTS

| 4,397,994 A | 8/1983 | Takeuchi et al. |
| 4,550,142 A | 10/1985 | Akita et al. |
| 4,742,117 A | 5/1988 | Tsutsumi et al. |
| 4,765,197 A | 8/1988 | Yarnell |
| 5,393,721 A | 2/1995 | Kitamura et al. |
| 5,508,333 A | 4/1996 | Shimizu |
| 5,527,860 A | 6/1996 | Yamakawa et al. |
| 5,552,499 A | 9/1996 | Kitamura et al. |
| 5,674,798 A | 10/1997 | Kitamura et al. |
| 5,883,183 A | 3/1999 | Kitamura et al. |
| 6,013,737 A | 1/2000 | Takagishi et al. |
| 7,405,256 B2 | 7/2008 | Hochi |
| 2004/0254301 A1 * | 12/2004 | Tsukimawashi et al. ..... 525/271 |
| 2008/0045664 A1 | 2/2008 | Sone et al. |

FOREIGN PATENT DOCUMENTS

| JP | 49 36957 | 10/1974 |
| JP | 52 5071 | 2/1977 |
| JP | 57 55912 | 4/1982 |
| JP | 58 162604 | 9/1983 |
| JP | 58 189203 | 11/1983 |
| JP | 59 38209 | 3/1984 |
| JP | 61 27338 | 2/1986 |
| JP | 61 43402 | 3/1986 |
| JP | 61 141741 | 6/1986 |
| JP | 64 22940 | 1/1989 |
| JP | 1 101344 | 4/1989 |
| JP | 1 188501 | 7/1989 |
| JP | 5 1298 | 1/1993 |
| JP | 5 230286 | 9/1993 |
| JP | 6 199923 | 7/1994 |
| JP | 6 279515 | 10/1994 |
| JP | 7 53616 | 2/1995 |
| JP | 7 233217 | 9/1995 |
| JP | 9 71687 | 3/1997 |
| JP | 2003 171418 | 6/2003 |
| JP | 2004 67987 | 3/2004 |
| JP | 2004 168903 | 6/2004 |
| JP | 2004 168904 | 6/2004 |
| JP | 2006 307095 | 11/2006 |
| JP | 2006 307096 | 11/2006 |

OTHER PUBLICATIONS

U.S. Appl. No. 12/532,764, filed Sep. 23, 2009, Shibata, et al.
U.S. Appl. No. 12/532,720, filed Sep. 23, 2009, Matsumoto, et al.
U.S. Appl. No. 12/521,340, filed Jun. 26, 2009, Tanaka, et al.
U.S. Appl. No. 12/521,331, filed Jun. 26, 2009, Tanaka, et al.

* cited by examiner

*Primary Examiner* — Ling-Siu Choi
*Assistant Examiner* — Hui Chin
(74) *Attorney, Agent, or Firm* — Oblon, Spivak, McClelland, Maier & Neustadt, L.L.P.

(57) ABSTRACT

A conjugated diolefin copolymer rubber is produced by copolymerization of a conjugated diolefin and an aromatic vinyl compound and has a primary amino group and an alkoxysilyl group bonded to the copolymer chain. The conjugated diolefin copolymer rubber contains the aromatic vinyl compound in an amount of 5 to 60 wt %. The aromatic vinyl compound is densely distributed in one terminal of the copolymer chain, and is scarcely distributed in the other terminal. The conjugated diolefin copolymer rubber has a temperature difference (ΔTg) of 25° C. or more. The conjugated diolefin copolymer rubber has low hysteresis loss properties as well as improved abrasion resistance, rupture characteristics, and road grip characteristics without impairing wet skid characteristics. A method for producing the conjugated diolefin copolymer rubber is also disclosed.

20 Claims, No Drawings

CONJUGATED DIOLEFIN COPOLYMER RUBBER, METHOD FOR PRODUCING THE SAME, RUBBER COMPOSITION AND TIRE

TECHNICAL FIELD

The present invention relates to a conjugated diolefin copolymer rubber, a method for producing the same, a rubber composition, and a tire. More particularly, the present invention relates to a conjugated diolefin copolymer rubber exhibiting excellent processability and capable of producing tire treads for vehicles with improved abrasion resistance, rupture characteristics, low hysteresis loss, and wet skid properties, a method for producing the same, a rubber composition, and a tire.

BACKGROUND ART

A conjugated diolefin rubber exhibiting excellent abrasion resistance, rupture characteristics, and grip characteristics as well as superior operational stability (e.g., wet skid resistance) has been desired as a tire material in order to deal with a recent demand for safety and operational stability of vehicles.

As a rubber material with a low hysteresis loss, natural rubber, polyisoprene rubber, polybutadiene rubber, and the like have been known. However, these rubber materials exhibit poor wet skid resistance.

As a method for decreasing hysteresis loss without impairing wet skid resistance, a method of introducing functional groups into the terminals of styrene-butadiene copolymers having various structures and polymerized in a hydrocarbon solvent using an organolithium initiator has been proposed. A styrene-butadiene copolymer obtained by modifying or coupling the polymer terminal with a tin compound (see Patent Document 1) and a styrene-butadiene copolymer obtained by modifying the polymer terminal with an isocyanate compound (see Patent Document 2) have been known. These modified polymers exhibit a reduced hysteresis loss and excellent abrasion resistance and rupture characteristics without showing reduced wet skid resistance particularly when using a composition containing carbon black as a reinforcing agent.

On the other hand, a method of using a rubber composition containing silica or a mixture of silica and carbon black as a reinforcing agent as a rubber material for tires has been proposed recently. A tire tread formed using silica or a mixture of silica and carbon black exhibits low rolling resistance and provides excellent operational stability represented by wet skid resistance. However, a vulcanizate thereof exhibits a low tensile strength and abrasion resistance. The above modified styrene-butadiene copolymer can produce an excellent rubber material for tires exhibiting superior abrasion resistance and rupture characteristics if carbon black is used as a reinforcing agent, but the effect is small when silica is used as a reinforcing agent.

In order to improve the tensile strength and the abrasion resistance of a vulcanizate containing silica or a mixture of silica and carbon black, a rubber composition containing a polymer into which a functional group having affinity with silica is introduced has been proposed. A method for producing a polymer by reacting silicon tetrahalide, trihalosilane, or the like has been proposed in Patent Document 3. Patent Document 4 discloses a method of producing a polymer modified by a halogenated silane compound. Patent Document 5 discloses a diene rubber with an alkyl silyl group introduced therein and Patent Document 6 discloses a diene rubber with a halogenated silyl group introduced therein. Patent Document 7 discloses a diene rubber into which a tertiary amino group and an alkoxysilyl group are introduced.

Although some improvement in properties can be seen by using these modified polymers in the composition comprising silica or a mixture of silica and carbon black, improvement in tensile strength and abrasion resistance of the vulcanizate is not sufficient. In addition, the effect of lowering the hysteresis loss is not necessarily satisfactory in the composition using a mixture of silica and carbon black, particularly when the proportion of carbon black is increased. Moreover, a silica-containing composition exhibits inferior processability as compared with a carbon black-containing composition, resulting in an increased processing cost. Processability tends to become worse when a polymer in which the above-described functional groups having affinity with silica are introduced.

Generally known modified polymers are classified into those suitable for use mainly with carbon black and those suitable for use with silica. When altering the type of a reinforcing agent used in manufacturing tires, rubbers to be used must be reselected. In addition, when a mixture of silica and carbon black is added, the effect obtained has a correlation with the ratio of silica and carbon black irrespective of the type of the modified polymer used.

Polymers modified by introducing an amino group are thought to be effective in either a composition to which carbon black is added or a composition to which silica is added. Examples of such polymers for use with carbon black that have been proposed include (1) polymers obtained by introducing an amino group into the polymer terminal using a lithium amide initiator (see Patent Documents 8 to 12) and (2) styrene-butadiene copolymers having different structures polymerized using an organolithium initiator, of which the terminals are modified with a nitrogen-containing compound such as a urea compound (see Patent Document 13), a dialkylamino benzophenone compound (see Patent Documents 14 and 15), or a lactam compound (see Patent Document 16). Diene rubbers with an amino group introduced therein have been disclosed as polymers for use with silica (see Patent Documents 17 to 19).

A certain degree of improvement in the properties has been achieved by the modified polymers obtained using these methods in both the compositions containing silica and the compositions containing carbon black. Although the above prior art contain detailed descriptions of the method of introducing an amino group, the prior art only disclose general information concerning the relationship between the structure and performance of the polymers.

As a novel conjugated diolefin copolymer rubber having good processability and well-balanced low hysteresis loss, abrasion resistance, and rupture characteristics without impairing wet skid properties which is used together with either carbon black or silica, the inventors of the present invention have previously proposed a copolymer rubber of a conjugated diolefin and an aromatic vinyl compound having a primary amino group and an alkoxysilyl group which are bonded to the copolymer chain (see Patent Documents 20 and 21). Rubber compositions having various improved rubber characteristics mentioned above can be obtained by using the proposed technology. However, in order to further improve operational stability and safety of vehicles, a copolymer rubber having excellent wet skid properties, abrasion resistance, a low rebounding coefficient, and road surface gripping characteristics in both dry and rainy conditions (dry grip and wet grip) has been desired.

Patent Document 1: JP-A-57-55912
Patent Document 2: JP-A-61-141741
Patent Document 3: JP-B-49-36957
Patent Document 4: JP-B-52-5071
Patent Document 5: JP-A-1-188501
Patent Document 6: JP-A-5-230286
Patent Document 7: JP-A-7-233217
Patent Document 8: JP-A-59-38209
Patent Document 9: JP-B-5-1298
Patent Document 10: JP-A-6-279515
Patent Document 11: JP-A-6-199923
Patent Document 12: JP-A-7-53616
Patent Document 13: JP-A-61-27338
Patent Document 14: JP-A-58-162604
Patent Document 15: JP-A-58-189203
Patent Document 16: JP-A-61-43402
Patent Document 17: JP-A-1-101344
Patent Document 18: JP-A-64-22940
Patent Document 19: JP-A-9-71687
Patent Document 20: JP-A-2003-171418
Patent Document 21: JP-A-2004-67987

DISCLOSURE OF THE INVENTION

An object of the present invention is to provide a novel conjugated diolefin copolymer rubber. Another object of the present invention is to provide a conjugated diolefin copolymer rubber exhibiting excellent processability, improved low hysteresis loss properties without impairing abrasion resistance and rupture characteristics, particularly exhibiting highly improved balance among wet skid properties, road gripping properties, and low rolling resistance when processed into tires, useful as a tread material for various tires and a side wall material, in the case where either carbon black or silica is incorporated therein.

Still another object of the present invention is to provide an industrially advantageous method for producing the conjugated diolefin copolymer rubber of the present invention.

Still another object of the present invention is to provide a rubber composition having the above-mentioned various characteristics containing the conjugated diolefin copolymer rubber of the present invention.

A further object of the present invention is to provide a tire using the rubber composition of the present invention as a tire tread component. Other objects of the present invention will become apparent from the following description. Specifically, the following conjugated diolefin copolymer rubber, a method for producing the same, a rubber composition, and a tire are provided according to the present invention.

[1] A conjugated diolefin copolymer rubber comprising a conjugated diolefin and an aromatic vinyl compound, the conjugated diolefin copolymer rubber (1) having a primary amino group and an alkoxysilyl group bonded to the copolymer chain, and (2) containing a polymerization unit of the aromatic vinyl compound in an amount of 5 to 60 wt %, (3) the aromatic vinyl compound being distributed densely in one terminal of the copolymer chain and scarcely distributed in the other terminal, and the conjugated diolefin copolymer rubber (4) having a temperature difference (ΔTg) between the inflection points in the glass transition temperature region of the endothermic curve determined using a differential scanning calorimeter (DSC) of 25° C. or more.

[2] The conjugated diolefin copolymer rubber according to [1], wherein the amount of aromatic vinyl compound single blocks having one polymerization unit of the aromatic vinyl compound is below 40 mass % of the total amount of the bonded aromatic vinyl compound, and the amount of aromatic vinyl compound micro blocks having 2 to 7 polymerization units of the aromatic vinyl compound is 50 mass % or more of the total amount of the bonded aromatic vinyl compound.

[3] The conjugated diolefin copolymer rubber according to [1], the conjugated diolefin copolymer rubber being obtained by copolymerization of the conjugated diolefin and the aromatic vinyl compound using an organic compound containing nitrogen as a hetero atom as an initiator.

[4] The conjugated diolefin copolymer rubber according to [1], wherein the content of the primary amino group is 0.5 to 200 mmol/kg·polymer, and the content of the alkoxysilyl group is 0.5 to 200 mmol/kg·polymer.

[5] The conjugated diolefin copolymer rubber according to any one of [1] to [4], wherein the temperature difference (ΔTg) between the inflection points in the glass transition temperature region is 30° C. or more.

[6] The conjugated diolefin copolymer rubber according to any one of [1] to [5], the conjugated diolefin copolymer rubber being shown by the following formula (1),

wherein P represents a copolymer chain of the conjugated diolefin and the aromatic vinyl compound, $R^1$ represents an alkylene group having 1 to 12 carbon atoms, $R^2$ and $R^3$ individually represent an alkyl group having 1 to 20 carbon atoms or an aryl group, n is 1 or 2, m is 1 or 2, and k is 1 or 2, provided that n+m+k is 3 or 4, or the following formula (2),

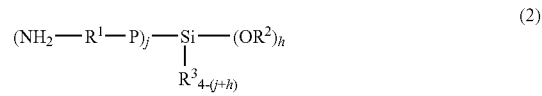

wherein P, $R^1$, $R^2$, and $R^3$ have the same meanings as defined for the formula (1), j is an integer from 1 to 3, and h is an integer from 1 to 3, provided that j+h is an integer from 2 to 4.

[7] A method for producing a conjugated diolefin copolymer rubber comprising copolymerizing a conjugated diolefin and an aromatic vinyl compound in a hydrocarbon solvent containing a Lewis base using an initiator that is at least one compound selected from the group consisting of organic alkali metal compounds, organic alkaline earth metal compounds, and lithium amide compounds, in the presence of a potassium compound added to the reaction medium using a monomer composition in which the molar ratio of the aromatic vinyl compound to the conjugated diolefin is 0.5 or more.

[8] The method according to [7], comprising reacting the polymerization active terminal obtained by polymerization with at least one amino group-containing alkoxysilane compound shown by the following formula (3),

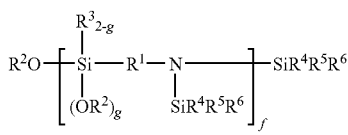

(3)

wherein $R^1$, $R^2$, and $R^3$ have the same meanings as defined for the formula (1), $R^4$, $R^5$, and $R^6$ individually represent an alkyl group having 1 to 20 carbon atoms or an aryl group, or two of $R^4$, $R^5$, and $R^6$ may bond to form a ring together with the silicon atom to which the $R^4$, $R^5$, and $R^6$ bond, g is 1 or 2, and f is an integer from 1 to 10, or the following formula (4),

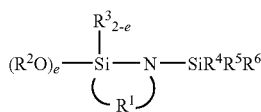

(4)

wherein $R^1$, $R^2$, and $R^3$ have the same meanings as defined for the formula (1), $R^4$, $R^5$, and $R^6$ have the same meanings as defined for the formula (3), and e is 1 or 2, and hydrolyzing the resulting polymer (hereinafter referred to as "first production method").

[9] The method according to [8], wherein the amino group-containing alkoxysilane compound is N,N-bis(trimethylsilyl)aminopropylmethyldimethoxysilane, N,N-bis(trimethylsilyl)aminopropylmethyldiethoxysilane, or 1-trimethylsilyl-2,2-dimethoxy-1-aza-2-silacyclopentane.

[10] The method according to [7], comprising anionically polymerizing the conjugated diolefin and the aromatic vinyl compound in a hydrocarbon solvent containing a Lewis base using a lithium amide initiator shown by the following formula (5), $$(R^4R^5R^6Si)_2-N-R^1-Li \quad (5)$$

wherein $R^1$ has the same meanings as defined for the formula (1) and $R^4$, $R^5$, and $R^6$ have the same meanings as defined for the formula (3), or the following formula (6),

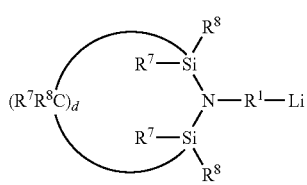

(6)

wherein $R^1$ has the same meaning as defined for the formula (1), $R^7$ and $R^8$ individually represent a hydrogen atom, an alkyl group having 1 to 20 carbon atoms, or an aryl group, and d is an integer from 1 to 7, in the presence of a potassium compound added to the reaction medium using a monomer composition in which the molar ratio of the aromatic vinyl compound to the conjugated diolefin is 0.5 or more, and reacting the resulting polymerization active terminal with an alkoxysilane compound shown by the following formula (7),

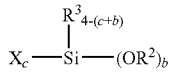

(7)

wherein $R^2$ and $R^3$ have the same meanings as defined for the formula (1), X is a halogen atom, c is an integer from 0 to 2, and b is an integer from 1 to 4, provided that c+b is an integer from 2 to 4 (hereinafter referred to as "second production method").

[11] The method according to any one of [7] to [10], wherein the polymerization reaction is carried out using an excess amount of the aromatic vinyl compound at an early stage of the reaction, and the conjugated diolefin in an amount of 30 mol % or more of the total monomers is added at a later stage of the polymerization reaction.

[12] The method according to any one of [7] to [11], wherein the potassium compound is a compound selected from the group consisting of potassium organic sulfonates, potassium organic carboxylates, potassium alkoxides, potassium phenoxides, and potassium salts of an organic phosphate.

[13] The method according to any one of [7] to [12], wherein the potassium compound is used in an amount of 0.01 to 0.5 mol per 1 g atom of the initiator selected from the group consisting of organic alkali metals, organic alkaline earth metals, and lithium amides.

[14] An oil-extended copolymer rubber comprising 100 parts by mass of the conjugated diolefin copolymer rubber according to any one of [1] to [6], and 10 to 100 parts by mass of an extender oil.

[15] A rubber composition comprising 100 parts by mass of a rubber component and 20 to 120 parts by mass of a filler, the rubber component including 30 wt % or more of the conjugated diolefin copolymer rubber according to any one of [1] to [6].

[16] The rubber composition according to [15], wherein at least one part by mass of the filler is silica, and the rubber composition further comprises 0.5 to 20 parts by weight of a silane coupling agent per 100 parts by mass of the silica.

[17] A tire member comprising the rubber composition according to [15] or [16] as a tread component.

The conjugated diolefin copolymer rubber of the present invention has improved wet skid characteristics, road grip characteristics, and low rolling resistance, and exhibits excellent performance when used as low fuel consumption high performance vehicle tires and a tread rubber for racing vehicle tires.

BEST MODE FOR CARRYING OUT THE INVENTION

The embodiments of the present invention are described in detail below. Note that the present invention is not limited to the following embodiments. Various alterations, modifications, and improvements may be made without departing from the scope of the present invention based on the knowledge of a person skilled in the art.

The conjugated diolefin copolymer rubber of the present invention is a copolymer obtained by copolymerization of a conjugated diolefin, an aromatic vinyl compound, and an optional another copolymerizable monomer (third monomer). The copolymer rubber contains a specific proportion of polymerization units of the aromatic vinyl compound. The polymerization units of the aromatic vinyl compound are unevenly distributed in the copolymer chain. The conjugated diolefin copolymer rubber has a primary amino group and an alkoxysilyl group at the terminals of the polymer chain.

The conjugated diolefin copolymer rubber of the present invention may have either a random copolymer structure or a block copolymer structure of the conjugated diolefin and the aromatic vinyl compound which are used as monomers. A conjugated diolefin copolymer rubber having a structure, in which the amount of the aromatic vinyl compound single blocks having one polymerization unit of the aromatic vinyl compound is below 40 mass % of the total amount of the bonded aromatic vinyl compound, and the amount of the aromatic vinyl compound micro blocks having 2 to 7 polymerization units of the aromatic vinyl compound is 50 mass % or more of the total amount of the bonded aromatic vinyl compound (such a structure is hereinafter referred to from time to time as "micro block structure"), may also be used.

In the conjugated diolefin copolymer rubber of the present invention, the aromatic vinyl compound is distributed densely in one terminal of the polymer chain and scarcely distributed in the other terminal, and the temperature difference ($\Delta Tg$) between the inflection points in the glass transition temperature region of the endothermic curve determined using a differential scanning calorimeter (DSC) is 25° C. or more. In this instance, the distribution of the aromatic vinyl compound may be dense either in the polymerization initiation terminal or in the polymerization end terminal of the copolymer chain.

Examples of the conjugated diolefins which are preferably used in the present invention include 1,3-butadiene, isoprene, 2,3-dimethyl-1,3-butadiene, 2-chloro-1,3-butadiene, 1,3-pentadiene, and a mixture of these.

The amount of the conjugated diolefins in the conjugated diolefin copolymer rubber of the present invention is 40 to 95 wt %, and preferably 50 to 95 wt %. If below 40 wt %, abrasion resistance and impact resilience are inferior; if exceeding 95 wt %, on the other hand, the rupture resistance is poor. The target rubber composition can not be obtained.

As examples of an aromatic vinyl compound, styrene, 2-methylstyrene, 3-methylstyrene, 4-methylstyrene, α-methylstyrene, 2,4-dimethylstyrene, 2,4-diisopropylstyrene, 4-tert-butylstyrene, divinylbenzene, tert-butoxystyrene, vinylbenzyldimethylamine, (4-vinylbenzyl)dimethyl aminoethyl ether, N,N-dimethylaminoethylstyrene, vinylpyridine, mixtures thereof, and the like can be given. Styrene is particularly preferable among these aromatic vinyl compounds.

The amount of the aromatic vinyl compounds in the conjugated diolefin copolymer rubber of the present invention is 5 to 60 wt %, and preferably 5 to 50 wt %. If below 5 wt %, rupture resistance is poor and the target rubber composition can not be obtained. If exceeding 60 wt %, the low hysteresis loss performance and impact resilience are inferior, and the rolling resistance of the tire produced from the composition increases.

As examples of the third monomer, acrylonitrile, methyl methacrylate, ethyl methacrylate, methyl acrylate, ethyl acrylate, hydroxyethyl methacrylate, and hydroxyethyl acrylate can be given.

The amount of the third monomers used in the copolymer rubber is usually 25 wt % or less, and preferably 15 wt % or less.

The conjugated diolefin copolymer rubber of the present invention is preferably obtained by the polymerization of the conjugated diolefin and the aromatic vinyl compound using an organic compound containing nitrogen as a hetero atom as a polymerization initiator. In this instance, the copolymer has a tertiary amino group which is a residue of the polymerization initiator at the polymerization terminal thereof. In another terminal of the copolymer chain, the copolymer of the present invention has a group formed by bonding of a primary amino group originating from the polymerization initiator and an alkoxysilyl group.

In the conjugated diolefin copolymer rubber of the present invention, the amount of the aromatic vinyl compound single blocks having one polymerization unit of the aromatic vinyl compound is preferably below 40 mass %, and more preferably 35 mol % or less, and the amount of the aromatic vinyl compound micro blocks having 2 to 7 polymerization units of the aromatic vinyl compound is preferably 50 mass % or more, more preferably 55 mass % or more, and particularly preferably 60 mass % or more. If the amount of the aromatic vinyl compound single blocks is 40 mass % or more, abrasion resistance, hardness, rupture characteristics, and tearing resistance are poor. If the amount of the aromatic vinyl compound micro blocks having 2 to 7 polymerization units of the aromatic vinyl compound is below 50 mass %, impact resilience and rolling resistance when using the copolymer rubber as a tire is inferior. The aromatic vinyl compound micro blocks are measured, for example, by decomposing the copolymer rubber using ozone and analyzing the decomposed product by gel permeation chromatography (Tanaka et al., Polymer, 22, 1721 (1981)).

The conjugated diolefin copolymer rubber of the present invention is not a simple random or block copolymer of the conjugated diolefin and the aromatic vinyl compound, but a copolymer in which the aromatic vinyl compound is densely distributed in one terminal of the polymer chain and is scarcely distributed in the other terminal. In this instance, the polymerization unit of the unevenly distributed aromatic vinyl compound may be a single block of the aromatic vinyl compound polymerization unit or a micro block having 2 to 8 polymerization units. In order to obtain the conjugated diolefin-aromatic vinyl compound copolymer having such a structure, a method of reacting in aromatic vinyl compound rich conditions at the start of polymerization and proceeding with the reaction while adding the conjugated diolefin in the later stage may be used, for example.

The conjugated diolefin copolymer rubber of the present invention has a temperature difference ($\Delta Tg$) between the inflection points in the glass transition temperature region of the endothermic curve determined using a differential scanning calorimeter (DSC) of 25° C. or more, preferably 30° C. or more, and more preferably 30 to 55° C. A randomly polymerized conjugated diolefin-aromatic vinyl compound copolymer has a temperature difference ($\Delta Tg$) in a range of 5 to 15° C. However, the temperature difference ($\Delta Tg$) is 25° C. or more when the distribution of the aromatic vinyl compound is uneven, i.e., when the aromatic vinyl compound is densely present in one side of the polymer chain. The larger the unevenness, the larger the temperature difference ($\Delta Tg$) (about 30 to 55° C.).

In the conjugated diolefin copolymer rubber of the present invention, a primary amino group and an alkoxysilyl group bond to the terminals of the conjugated diolefin-aromatic vinyl compound copolymer in which copolymer chain has unevenly-distributed aromatic vinyl compound units.

The amount of the primary amino group bonded to the copolymer rubber is preferably 0.5 to 200 mmol/kg·polymer, more preferably 1 to 100 mmol/kg·polymer, and particularly preferably 2 to 50 mmol/kg·polymer. The unit "kg·polymer" refers to the weight of the polymer excluding additives such as an antioxidant which are added during or after manufacturing.

The primary amino group may bond to any of the polymerization initiation terminal, the polymerization end terminal, the polymer main chain, and the side chain, but is preferably introduced into the polymerization initiation terminal or the polymerization end terminal in order to improve the hysteresis loss characteristics while suppressing the energy loss from the polymer terminals.

When the amount of the primary amino group which bonds to the polymer chain exceeds 200 mmol/kg·polymer, the mutual reaction with the reinforcing agents such as carbon black and silica unduly increases, which results in an increase in the viscosity of the composition. As a result, processability is impaired. On the other hand, if the amount of the primary amino group which bonds to the polymer chain is below 0.5 mmol/kg·polymer, it is difficult for the conjugated diolefin copolymer rubber to exhibit the effect of introducing the primary amino group. Specifically, improvement in the hysteresis loss characteristics, abrasion resistance, and rupture characteristics of the copolymer rubber is insufficient.

The amount of the alkoxysilyl group bonded to the copolymer rubber is preferably 0.5 to 200 mmol/kg·polymer, more preferably 1 to 100 mmol/kg·polymer, and particularly preferably 2 to 50 mmol/kg·polymer.

The alkoxysilyl group may bond to any of the polymerization initiation terminal, the polymerization end terminal, the polymer main chain, and the side chain, but is preferably introduced into the polymerization end terminal in order to improve the hysteresis loss characteristics while suppressing the energy loss from the polymer terminals.

When the amount of the alkoxysilyl group which bonds to the polymer chain exceeds 200 mmol/kg·polymer, the mutual reaction with the reinforcing agents such as carbon black and silica unduly increases, which results in an increase in the viscosity of the composition. As a result, processability is impaired. On the other hand, if the amount of the alkoxysilyl group is below 0.5 mmol/kg·polymer, it is difficult for the conjugated diolefin copolymer rubber to exhibit the effect of introducing the alkoxysilyl group. Specifically, improvement in the hysteresis loss characteristics, abrasion resistance, and rupture characteristics of the copolymer rubber is insufficient.

Therefore, such a conjugated diolefin copolymer rubber is shown by the following formula (1),

(1)

wherein P represents a copolymer chain of the conjugated diolefin and the aromatic vinyl compound, $R^1$ represents an alkylene group having 1 to 12 carbon atoms, $R^2$ and $R^3$ individually represent an alkyl group having 1 to 20 carbon atoms or an aryl group, n is 1 or 2, m is 1 or 2, and k is 1 or 2, provided that n+m+k is 3 or 4, or the following formula (2),

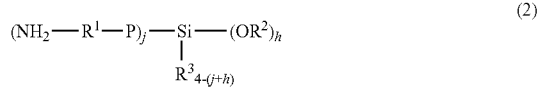

(2)

wherein P, $R^1$, $R^2$, and $R^3$ have the same meanings as defined for the formula (1), j is an integer from 1 to 3 and h is an integer from 1 to 3, provided that j+h is an integer from 2 to 4.

In the conjugated diolefin copolymer rubber of the formula (1) or (2), P is a conjugated diolefin-aromatic vinyl compound copolymer chain in which the aromatic vinyl compound units are densely distributed on one end the copolymer chain as mentioned above.

The conjugated diolefin copolymer rubber having such a structure in which the aromatic vinyl compound is distributed densely on one end the copolymer chain and the primary amino group and the alkoxysilyl group bond to the end of the copolymer chain has improved wet skid characteristics, grip characteristics, and low rolling resistance to a road surface as compared with general rubbers and exhibits very excellent performance when used to produce low fuel consumption high performance vehicle tires and a tread rubber for racing vehicle tires.

The method for producing the conjugated diene copolymer rubber of the present invention is described below. The conjugated diolefin copolymer rubber of the present invention can be produced by copolymerizing the conjugated diolefin and the aromatic vinyl compound in a hydrocarbon solvent containing a Lewis base using an initiator that is at least one compound selected from the group consisting of organic alkali metal compounds, organic alkaline earth metal compounds, and lithium amide compounds, in the presence of a potassium compound added to the reaction medium using a monomer composition containing an excess amount of the aromatic vinyl compound, i.e. a monomer composition in which the molar ratio of the aromatic vinyl compound to the conjugated diolefin is 0.5 or more, preferably 0.55 or more, and reacting an alkoxysilane compound with the active terminal of the resulting polymer.

In order to have the aromatic vinyl compound unevenly distributed in the polymer chain, it is important to add a potassium compound to the polymerization reaction system of the conjugated diolefin and the aromatic vinyl compound in the hydrocarbon solvent in the presence of the initiator and to control the concentration of the aromatic vinyl compound under specific conditions in the course of the reaction in either the first production method or the second production method of the conjugated diolefin copolymer rubber of the present invention which are described below in detail. Specifically, in an effective method of polymerization reaction, a monomer composition which is used has a molar ratio of the aromatic vinyl compound and the conjugated diolefin of 0.5 or more, preferably 0.55 or more, and 0.9 or less, and preferably 0.8 or less at the initial stage of the polymerization reaction and thereafter an additional amount of the conjugated diolefin monomer is added so as to maintain a specific concentration of the aromatic vinyl compound in the reaction system. As the method for adding an additional amount of the conjugated diolefin monomer, a method of additionally adding the conjugated diolefin monomer in an amount of 30 mol % or more, and preferably 35 mol % or more of the total monomers in the later stage of the polymerization reaction can be given. As the method of additional addition, a method of adding the total amount at one time, a method of adding continuously or intermittently and the like can be given.

In the first production method, the copolymer rubber can be produced by anionically polymerizing the conjugated diolefin and the aromatic vinyl compound in the hydrocarbon solvent using an organic alkali metal and/or an alkaline earth metal as a polymerization initiator in the presence of the potassium compound, adding a compound having a protected primary amino group and an alkoxysilyl group at the time when the polymerization is substantially completed to react that compound with living polymerization chain terminals, and deprotecting the protected groups by hydrolysis. According to this method, (1) a primary amino group and an alkoxysilyl group can be easily introduced at the same time by a single step reaction and (2) a high introduction rate of the primary amino group and alkoxysilyl group can be achieved.

As examples of the compound having a protected primary amino group and an alkoxysilyl group, compounds shown by the following formula (3) or (4)

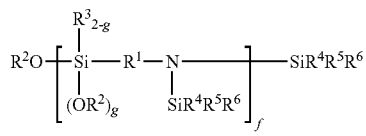

(3)

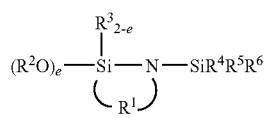

(4)

can be given.

As examples of the alkylene group having 1 to 12 carbon atoms represented by $R^1$ in the above formulas (3) and (4), a methylene group, an ethylene group, and a propylene group can be given.

As examples of the alkyl group having 1 to 20 carbon atoms, a methyl group, an ethyl group, and a propyl group can be given.

As examples of the aryl group, a phenyl group, a tolyl group, and a naphthyl group can be given.

$R^4$, $R^5$, and $R^6$ may bond to form a 4 to 7 member ring together with the silicon atom to which the $R^4$, $R^5$, and $R^6$ bond.

As the protective group for the amino group, an alkylsilyl group can be given. As examples of the alkylsilyl group, a trimethylsilyl group, a triethylsilyl group, a triphenylsilyl group, a methyldiphenylsilyl group, and an ethylmethylphenylsilyl group can be given.

As examples of the compound having a protected primary amino group and an alkoxysilyl group, N,N-bis(trimethylsilyl)aminopropylmethyldimethoxysilane, 1-trimethylsilyl-2,2-dimethoxy-1-aza-silacyclopentane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethyltriethoxysilane, N,N-bis(trimethylsilyl)aminoethylmethyldimethoxysilane, N,N-bis(trimethylsilyl)aminoethylmethyldiethoxysilane, and the like can be given. Among these, N,N-bis(trimethylsilyl)aminopropylmethyldimethoxysilane, N,N-bis(trimethylsilyl)aminopropylmethyldiethoxysilane, and 1-trimethylsilyl-2,2-dimethoxy-1-aza-silacyclopentane are preferable.

According to the second production method of the present invention, the conjugated diolefin and the aromatic vinyl compound are anionically polymerized in a hydrocarbon solvent in the presence of a potassium compound using a lithium amide initiator shown by the following formula (5),

(5)

wherein $R^1$, $R^4$, $R^5$, and $R^6$ have the same meanings as defined for the formula (3), or the following formula (6),

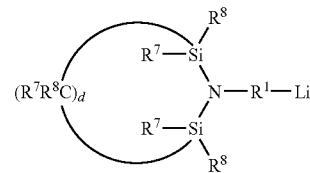

(6)

wherein $R^1$ has the same meaning as defined for the formula (3), $R^7$ and $R^8$ individually represent a hydrogen atom, an alkyl group having 1 to 20 carbon atoms, or an aryl group, and d is an integer from 1 to 7, and at the time when the polymerization is substantially completed, an alkoxysilane compound shown by the following formula (7),

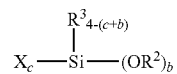

(7)

wherein $R^2$ and $R^3$ have the same meanings as defined for the formula (3), X is a halogen atom, c is an integer from 0 to 2, and b is an integer from 1 to 4, provided that c+b is an integer from 2 to 4, is added to react with the living polymerization chain terminals.

Next, the first production method is described in detail. The polymerization reaction and the reaction with the compound having a protected primary amino group and an alkoxysilyl group for obtaining the copolymer rubber of the present invention are carried out either at a constant temperature or while raising the temperature, usually in the temperature range of 0 to 120° C. Hydrolysis for deprotecting the protected primary amino group is carried out at a temperature in a range of 80 to 150° C., and preferably 90 to 120° C. by adding water or an acidic aqueous solution in an amount of twice or more of the mol of the compound having the protected primary amino group and the alkoxysilyl group for 10 minutes or more, and preferably 30 minutes or more. Either a batch polymerization system or a continuous polymerization system may be used for the polymerization reaction.

As examples of the organic alkali metal and the organic alkaline earth metal used as an initiator, alkyl lithium such as n-butyllithium, sec-butyllithium, and t-butyllithium; alkylenedilithium such as 1,4-dilithiobutane; phenyllithium, stilbenelithium, lithium naphthalene, sodium naphthalene, potassium naphthalene, n-butylmagnesium, n-hexylmagnesium, ethoxycalcium, calcium stearate, t-butoxystrontium, ethoxybarium, isopropoxybarium, ethylmercaptobarium, t-butoxybarium, phenoxybarium, diethylaminobarium, barium stearate, and the like can be given.

A bifunctional organic alkali metal compound may be used as the polymerization initiator, as required. As the bifunctional organic alkali metal compound polymerization initiator, aromatic radical anions such as lithium naphthalene and sodium naphthalene are well known. The bifunctional organic alkali metal polymerization initiator may be synthesized by the reaction of an aromatic divinyl compound and an organic alkali metal or an organic alkaline earth metal in an amount two times the amount of aromatic divinyl compound. As examples of the aromatic divinyl compound, m-divinylbenzene, m-diisopropenylbenzene, and 1,3-bis(1-phenylethenyl)benzene can be given.

The organic alkali metal as the initiator may be used to copolymerize the conjugated diolefin and the aromatic vinyl compound as a reaction product with a secondary amine compound or a tertiary amine compound. As the organic alkali metal which is reacted with the secondary amine compound or the tertiary amine compound, an organolithium compound is preferable. It is more preferable to use n-butyllithium or sec-butyllithium.

As examples of the secondary amine compound reacted with the organic alkali metal, dimethylamine, diethylamine, dipropylamine, di-n-butylamine, di-sec-butylamine, dipentylamine, dihexylamine, di-n-octylamine, di-(2-ethylhexyl) amine, dicyclohexylamine, N-methylbenzylamine, diallylamine, morpholine, piperazine, 2,6-dimethylmorpholine, 2,6-dimethylpiperazine, 1-ethylpiperazine, 2-methylpiperazine, 1-benzylpiperazine, piperidine, 3,3-dimethylpiperidine, 2,6-dimethylpiperidine, 1-methyl-4-(methylamino)piperidine, 2,2,6,6-tetramethylpiperidine, pyrrolidine, 2,5-dimethylpyrrolidine, azetidine, hexamethyleneimine, heptamethyleneimine, 5-benzyloxyindole, 3-azaspiro[5,5]undecane, 3-azabicyclo[3.2.2]nonane, carbazole, and the like can be given.

As the tertiary amine compound reacted with the organic alkali metal, N,N-dimethyl-o-toluidine, N,N-dimethyl-p-toluidine, N,N-dimethyl-m-toluidine, α-picoline, β-picoline, γ-picoline, benzyldimethylamine, benzyldiethylamine, benzydipropylamine, benzyldibutylamine, (o-methylbenzyl)dimethylamine, (m-methylbenzyl)dimethylamine, (p-methylbenzyl)dimethylamine, N,N-tetramethylene-o-toluidine, N,N-heptamethylene-o-toluidine, N,N-hexamethylene-o-toluidine, N,N-trimethylenebenzylamine, N,N-tetramethylenebenzylamine, N,N-hexamethylenebenzylamine, N,N-tetramethylene(o-methylbenzyl)amine, N,N-tetramethylene(p-methylbenzyl)amine, N,N-hexamethylene(o-methylbenzyl)amine, N,N-hexamethylene(p-methylbenzyl)amine, and the like can be given.

As the initiator, an organic compound containing nitrogen as a hetero atom is preferable. As examples, a reaction product of a tertiary amine compound and an organic alkali metal compound and an organic alkali metal compound which contains nitrogen as a hetero atom can be given. Compounds similar to the above-mentioned compounds can be given as examples of the tertiary amine compound. Details of such initiators are described in JP-A-11-246633.

The above alkali metal compounds are compounds obtained by replacing the active hydrogen atom (H) in the above tertiary amine compound with an alkali metal (Li, Na, K, Rb, or Sc).

When the reaction product of a tertiary amine compound and an organic alkali metal compound is used as a polymerization initiator in the copolymerization of the conjugated diolefin and the aromatic vinyl compound, an organolithium compound is preferable as the organic alkali metal compound to be reacted with the tertiary amine compound. Specific examples are ethyl lithium, propyl lithium, n-butyl lithium, sec-butyl lithium, tert-butyl lithium, hexyl lithium, or a mixture of these, with n-butyl lithium and sec-butyl lithium being preferred.

An ether compound such as diethyl ether, di-n-butyl ether, ethylene glycol diethyl ether, ethylene glycol dibutyl ether, diethylene glycol dimethyl ether, propylene glycol dimethyl ether, propylene glycol diethyl ether, propylene glycol dibutyl ether, tetrahydrofuran, 2,2-(bistetrahydrofurfuryl)propane, bistetrahydrofurfurylformal, methyl ether of tetrahydrofurfuryl alcohol, ethyl ether of tetrahydrofurfuryl alcohol, butyl ether of tetrahydrofurfuryl alcohol, α-methoxytetrahydrofuran, dimethoxybenzene, or dimethoxyethane and/or a tertiary amine compound such as triethylamine, pyridine, N,N,N',N'-tetramethylethylenediamine, dipiperidinoethane, methyl ether of N,N-diethylethanolamine, ethyl ether of N,N-diethylethanolamine, or butyl ether of N,N-diethylethanolamine may optionally be added to the polymerization system to adjust the microstructure (vinyl bond content) of the conjugated diolefin units in the conjugated diolefin copolymer rubber.

As examples of the hydrocarbon solvent used for the polymerization of the copolymer rubber of the present invention, pentane, hexane, heptane, octane, methylcyclopentane, cyclohexane, benzene, toluene, and xylene can be given. Of these, cyclohexane and heptane are preferable.

In order to have the aromatic vinyl compound distributed densely on one of the sides and scarcely on the other side of the copolymer chain in the present invention, it is necessary to add a potassium compound together with the above polymerization initiator.

In addition, the reaction is carried out using an excess amount of the aromatic vinyl compound, i.e. using a monomer composition having a molar ratio of the aromatic vinyl compound and the conjugated diolefin of 0.5 or more, and preferably 0.55 or more, at the initial stage of the polymerization, and when the concentration of the aromatic vinyl compound is reduced along with progress of the reaction, 30 mol % or more, and preferably 35 mol % or more of the conjugated diolefin is intermittently or continuously added to continue the reaction. In this manner, the conjugated diolefin copolymer in which the aromatic vinyl compound is densely distributed in an early stage of the polymerization reaction and scarcely distributed in the later stage of the polymerization reaction can be obtained.

Examples of the potassium compound which may be added in combination with the initiator include potassium alkoxides and potassium phenoxides such as potassium isopropoxide, potassium t-butoxide, potassium t-amyloxide, potassium n-heptaoxide, potassium benzyl oxide, and potassium phenoxide; potassium salts of organic carboxylic acid such as isovalerianic acid, caprylic acid, lauric acid, palmitic acid, stearic acid, oleic acid, linolenic acid, benzoic acid, phthalic acid, 2-ethylhexanoic acid, and the like; potassium salts of an organic sulfonic acid such as dodecylbenzenesulfonic acid, tetradecylbenzenesulfonic acid, hexadecylbenzenesulfonic acid, and octadecylbenzenesulfonic acid; potassium salts of an organic phosphorous acid partial ester such as diethyl phosphite, diisopropyl phosphite, diphenyl phosphite, dibutyl phosphite, and dilauryl phosphite; and the like.

These potassium compounds may be added in an amount of 0.005 to 0.5 mol per gram atomic equivalent of the alkali metal used in the initiator. If the amount of the potassium compound is below 0.005 mol, the effects of adding the potassium compound (i.e., an improvement in the reactivity of the initiator, random arrangement of the aromatic vinyl compounds, or formation of a single block or a micro block of the aromatic vinyl compound) may not be obtained. If the amount of the potassium compound exceeds 0.5 mol, the polymerization activity decreases so that the productivity significantly decreases. Moreover, the modification efficiency when modifying the polymer end with the functional group decreases.

In addition to the potassium compound, one or more compounds selected from the group consisting of an alcohol, a thioalcohol, an organic carboxylic acid, an organic sulfonic acid, an organic phosphorous acid, a primary amine, and a secondary amine may be used in an amount of 0.1 to 5 mol per one mol of the potassium salt and 0.1 mol or less per one gram of the organic alkali metal and/or an organic alkaline earth metal.

Preferable compounds are described in JP-A-63-297410 (from line 5 in the lower right column of page 3 through line 9 in the upper left column of page 4).

It is also possible to add the following coupling agents together with the amino group-containing alkoxysilane compound.

As examples of the coupling agent to be reacted with the active polymer terminal together with the amino group-containing alkoxysilane compound, at least one compound selected from the group consisting of (a) isocyanate compounds and/or isothiocyanate compounds, (b) amide compounds and/or imide compounds, (c) pyridyl-substituted ketone compounds and/or pyridyl-substituted vinyl compounds, (d) silicon compounds, (e) ester compounds, (f) ketone compounds, and (g) tin compounds can be given.

As preferred examples of the isocyanate compounds or thioisocyanate compounds (component (a)), 2,4-tolylene diisocyanate, 2,6-tolylene diisocyanate, diphenylmethane diisocyanate, polymeric-type diphenylmethane diisocyanate (C-MDI), isophorone diisocyanate, hexamethylene diisocyanate, 1,3,5-benzene triisocyanate, phenyl-1,4-diisothiocyanate, and the like can be given.

As preferred examples of the amide compounds or imide compounds (component (b)), amide compounds such as succinamide, phthalamide, N,N,N',N'-tetramethylphthalamide, oxamide, N,N,N',N'-tetramethyloxamide and imide compounds such as succinimide, N-methylsuccinimide, maleimide, N-methylmaleimide, phthalimide, N-methylphthalimide, and the like can be given.

As preferred examples of the pyridyl-substituted ketone compounds or pyridyl-substituted vinyl compounds (component (c)), dibenzoylpyridine, diacetylpyridine, divinylpyridine, and the like can be given.

As preferred examples of the silicon compounds (component (d)), dibutyldichloro silicon, methyltrichloro silicon, methyldichloro silicon, tetrachloro silicon, triethoxymethylsilane, triphenoxymethylsilane, trimethoxysilane, methyltriethoxysilane, 4,5-epoxyheptylmethyldimethoxysilane, bis(triethoxysilylpropyl)tetrasulfide, and the like can be given.

As preferred examples of the ester compounds (component (e)), diethyl adipate, diethyl malonate, diethyl phthalate, diethyl glutarate, diethyl maleate, and the like can be given.

As preferred examples of the ketone compounds (component (f)), N,N,N',N'-tetramethyl-4,4'-diaminobenzophenone, N,N,N',N'-tetraethyl(4,4'-diamino)-benzophenone, N,N-dimethyl-1-aminobenzoquinone, N,N,N',N'-tetramethyl-1,3-diaminobenzoquinone, N,N-dimethyl-1-aminoanthraquinone, N,N,N',N'-tetramethyl-1,4-diaminoanthraquinone, and the like can be given.

As specific examples of the tin compounds (component (g)) that can be preferably used, tetrachlorotin, tetrabromotin, trichlorobutyltin, trichloromethyltin, trichlorooctyltin, dibromodimethyltin, dichlorodimethyltin, dichlorodibutyltin, dichlorodioctyltin, 1,2-bis(trichlorostanyl)ethane, 1,2-bis(methyldichlorostanylethane), 1,4-bis(trichlorostanyl)butane, 1,4-bis(methyldichlorostanyl)butane, ethyltin tristearate, butyltin trisoctanoate, butyltin trisstearate, butyltin trislaurate, dibutyltin bisoctanoate, dibutyltin bisstearate, dibutyltin bislaurate, and the like can be given.

These compounds which are used together with the amino group-containing alkoxysilane compound to be reacted with the active polymer terminal may be used either individually or in combination of two or more.

The above coupling agents may be added in an amount of 0.4 mol or less, preferably 0.3 mol or less per gram atomic equivalent of the alkali metal used in the initiator. If exceeding 0.4 mol, the degree of modification by the amino group-containing alkoxysilane compound is lowered, resulting in poor product properties. The coupling rate of the total copolymer chain by the coupling agent is usually 40% or less, and preferably 30% or less.

Next, the second production method of the present invention is described in detail. The polymerization reaction using a lithium amide initiator in which the primary amino group is protected and the reaction with the alkoxysilane compound for obtaining the copolymer rubber of the present invention are carried out either at a constant temperature or while raising the temperature, usually in the temperature range of 0 to 120° C. Hydrolysis for deprotecting the protected primary amino group is carried out at a temperature in a range of 80 to 150° C., and preferably 90 to 120° C. by adding water or an acidic aqueous solution in an amount of twice or more of the moles of the lithium amide initiator in which the primary amino group is protected for 10 minutes or more, and preferably 30 minutes or more. Either a batch polymerization system or a continuous polymerization system may be used for the polymerization reaction.

It should be understood that any matter described in the first production method is applied to the second production method as is or after alteration obvious to a person having an ordinary skill in the art.

Examples of the lithium amide initiator shown by the formula (5) include 3-[N,N-bis(trimethylsilyl)]-1-propyllithium, 3-[N,N-bis(trimethylsilyl)]-2-methyl-1-propyllithium, 3-[N,N-bis(trimethylsilyl)]-2,2-dimethyl-1-propyllithium, 4-[N,N-bis(trimethylsilyl)]-1-butyllithium, 5-[N,N-bis(trimethylsilyl)]-1-pentyllithium, and 8-[N,N-bis(trimethylsilyl)]-1-octyllithium.

Examples of the lithium amide initiator shown by the formula (6) include 3-(2,2,5,5-tetramethyl-2,5-disila-1-azacyclopentane)-1-propyllithium, 2-methyl-3-(2,2,5,5-tetramethyl-2,5-disila-1-azacyclopentane)-1-propyllithium, 2,2-dimethyl-3-(2,2,5,5-tetramethyl-2,5-disila-1-azacyclopentane)-1-propyllithium, 4-(2,2,5,5-tetramethyl-2,5-disila-1-azacyclopentane)-1-butyllithium, and 6-(2,2,5,5-tetramethyl-2,5-disila-1-azacyclopentane)-1-hexyllithium.

The lithium amide initiator may be replaced with a compound obtained by a corresponding halide and an organolithium compound in a hydrocarbon solvent. The halide and the organolithium compound may be previously reacted in a vessel separate from the polymerization reactor.

Examples of the halide corresponding to the lithium amide initiator include compounds shown by the following formula (8),

$$(R^4R^5R^6Si)_2-N-R^1-X \quad (8)$$

wherein $R^1$, $R^4$, $R^5$, and $R^6$ have the same meanings as defined for the formula (3) and X indicates a halogen atom, or the following formula (9),

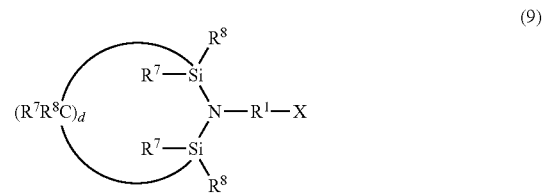

$$(9)$$

wherein $R^1$ has the same meaning as defined for the formula (3), $R^7$ and $R^8$ individually represent a hydrogen atom, an alkyl group having 1 to 20 carbon atoms, or an aryl group, and d is an integer from 1 to 7.

As examples of the alkoxysilane compound shown by the formula (7), tetramethoxysilane, tetraethoxysilane, tetrapropoxysilane, tetrabutoxysilane, tetraphenoxysilane, tetratolyloxysilane, methyltrimethoxysilane, methyltriethoxysilane, methyltripropoxysilane, methyltributoxysilane, methyltriphenoxysilane, ethyltrimethoxysilane, ethyltriethoxysilane, ethyltripropoxysilane, ethyltributoxysilane, ethyltriphenoxysilane, dimethyldimethoxysilane, dimethyldiethoxysilane, dimethyldipropoxysilane, dimethyldibutoxysilane, dimethyldiphenoxysilane, diethyldimethoxysilane, diethyldiethoxysilane, diethyldipropoxysilane, diethyldibutoxysilane, diethyldiphenoxysilane, vinyltrimethoxysilane, vinyltriethoxysilane, vinyltripropoxysilane, vinyltributoxysilane, vinyltriphenoxysilane, allyltriphenoxysilane, octenyltrimethoxysilane, phenyltrimethoxysilane, phenyltriethoxysilane, phenyltripropoxysilane, phenyltributoxysilane, phenyltriphenoxysilane, trimethoxychlorosilane, triethoxychlorosilane, tripropoxychlorosilane, tributoxychlorosilane, triphenoxychlorosilane, dimethoxydichlorosilane, dipropoxydichlorosilane, and diphenoxydichlorosilane can be given.

In order to have the aromatic vinyl compound distributed densely on one of the sides and scarcely on the other side of the copolymer chain in the present invention, it is necessary to add the potassium compound together with the above polymerization initiator. The same potassium compounds mentioned in the first production method may be used in the second production method. In addition, the reaction is carried out using an excess amount of the aromatic vinyl compound, i.e. using a monomer composition having a molar ratio of the aromatic vinyl compound and the conjugated diolefin of 0.5 or more, and preferably 0.55 or more, at the initial stage of the polymerization, and when the concentration of the aromatic vinyl compound is reduced along with progress of the reaction, 30 mol % or more, and preferably 35 mol % or more of the conjugated diolefin is intermittently or continuously added to continue the reaction. In this manner, the conjugated diolefin copolymer in which the aromatic vinyl compound is densely distributed in an early stage of the polymerization reaction and scarcely distributed in the later stage of the polymerization reaction can be obtained.

The weight average molecular weight of the copolymer rubber obtained in the present invention is usually 150,000 to 2,000,000, and preferably 200,000 to 1,000000. If below 150,000, breaking strength, abrasion resistance, and the like of the resulting rubber composition are insufficient. If exceeding 2,000,000, on the other hand, the rubber composition has poor processability. The filler can be dispersed only inadequately during the kneading operation, resulting in products with inferior properties.

The Mooney viscosity ($ML_{1+4}$, 100° C.) of the copolymer rubber obtained in the present invention is preferably in a range of 20 to 200. If below 20, breaking strength, abrasion resistance, and low hysteresis loss properties are impaired. If exceeding 200, processability is poor. A polymer having a Mooney viscosity ($ML_{1+4}$, 100° C.) exceeding 100 is not preferable due to poor processability. However, such a polymer may be used without the processability problem by decreasing the Mooney viscosity to 100 or less by adding an extender oil such as aromatic process oil or naphthenic process oil or a liquid polymer having a weight average molecular weight of 150,000 or less. The extender oil used is not particularly limited insofar as it is an extender oil or a softener normally used for diene rubber. An extender oil based on mineral oil is preferably used. The extender oil based on mineral oil is generally a mixture of aromatic oil, alicyclic oil, and aliphatic oil. The extender oil is classified into aromatic oil, alicyclic oil (naphthens), and aliphatic oil (paraffins) depending on the ratio of these oils. Any of these oils may be used. In particular, aromatic mineral oil (aromatic oil) with a viscosity gravity constant (VGC) of 0.900 to 1.049 and an aliphatic mineral oil (naphthenic oil) with a viscosity gravity constant of 0.800 to 0.899 are preferably used with respect to low hysteresis loss properties/wet skid resistance. DAE (Distillate Aromatic Extract) oil, T-DAE (Treated Distillate Aromatic Extract) oil, T-RAE (Treated Residual Aromatic Extract) oil, and MES (Mild Extract Solvate) oil which are petroleum fractions classified according to the oil manufacturing processes are preferably used.

An oil extended rubber containing 100 parts by mass of the conjugated diolefin copolymer rubber and 10 to 100 parts by mass of the extender oil is preferably provided according to the present invention.

The polymer solution containing the copolymer rubber obtained in the present invention may be processed using a method utilized for a normal solution polymerization method such as a method of adding a stabilizer or the like to the solution optionally adding the extender oil (e.g. aromatic process oil, naphthenic process oil, and DAE, T-DAE, T-RAE, and MES) or the liquid polymer with a weight average molecular weight of 150,000 or less (or a solution of the above liquid polymer), separating the rubber from the solvent using a direct drying method or a steam stripping method, washing the rubber, and drying the resulting product using a vacuum dryer, a hot-air dryer, or a roller, to isolate the target diene rubber.

The copolymer rubber of the present invention or a mixture of the copolymer rubber and a natural rubber, polyisoprene rubber, polybutadiene rubber, emulsion polymerization styrene-butadiene rubber, or the like is kneaded in a roller or a Banbury blender together with a reinforcing agent such as carbon black or silica. The rubber composition thus obtained is then vulcanized by the addition of sulfur, a vulcanization accelerator, and the like, and used for tires such as treads, side walls, and carcasses, as well as other industrial products such as belts, vibration-proof rubber, and the like.

As examples of the reinforcing material used when using the copolymer rubber in tires, particularly a tire thread, fillers such as carbon black and silica can be given.

Carbon black is particularly preferable when excellent abrasion resistance and breaking strength are desired by effectively reinforcing the vulcanized rubber. The filler is added preferably in an amount of 20 to 120 parts by mass, and more preferably 30 to 110 parts by mass per 100 parts by mass of the total rubber component. Carbon black manufactured by a furnace method and having a nitrogen adsorption specific surface area of 50 to 200 $m^2/g$ and DBP oil absorption of 80 to 200 ml/100 g, such as FEF, HAF, ISAF, or SAF class carbon black, particularly high aggregation type carbon black, is preferable.

When the copolymer rubber is used for low-fuel-consumption tires, silica is preferably used in order to provide excellent rolling resistance by reducing hysteresis loss, improve wet skid resistance, and optionally promote grip performance on snow and ice (low temperature properties) of the vulcanized rubber. As silica, any of wet process silica, dry process silica, and synthetic silicate-type silica can be used. Silica with a small particle diameter exhibits a high reinforcing effect. Small diameter, high agglomeration-type silica (i.e. that having a large surface area and high oil absorptivity) exhibits excellent dispersibility in rubber, desirable properties, and superior processability. The average particle diameter of the silica, in terms of a primary particle diameter, is preferably from 5 to 60 μm, and particularly preferably from 10 to 35 µm. The silica is added in an amount of preferably 20 to 120 parts by mass, and more preferably 30 to 110 parts by mass per 100 parts by mass of the total rubber component.

When silica is used as the filler, various types of general silane coupling agents may be used in order to promote the reinforcing affect. The term "coupling agent" used herein refers to a compound having a component which can react with the surface of silica such as an alkoxysilyl group and a component which can react with rubber (particularly carbon-carbon double bond) such as a polysulfide group, a mercapto group, or an epoxy group, in its molecule. For example, bis-(3-triethoxysilylpropyl)tetrasulfide, bis-(3-triethoxysilylpropyl)disulfide, and 3-mercaptopropyltrimethoxysilane, and the like are well known.

When using silica as the filler, it is desirable to use the silica in an amount of at least one part by mass of the filler and to add 0.5 to 20 wt % of a silane coupling agent. Silica exhibits improved dispersibility in such a composition. In addition, the copolymer rubber has improved breaking strength, abrasion resistance, and low hysteresis loss properties due to an increase in the amount of bonding of silica and rubber.

High dispersible type silica is preferable in order to improve dispersibility in the rubber and promote properties and processability.

In addition, it is possible to provide the copolymer rubber with well-balanced good abrasion resistance and breaking strength, and excellent low hysteresis loss performance and wet grip performance by the combined use of carbon black and silica in an amount of 20 to 120 parts by mass for 100 parts by mass of the total rubber components.

Carbon-silica dual-phase-fillers, if added to the copolymer rubber of the present invention, can exhibit the same effects as those obtained by the combined use of carbon black and silica. The carbon-silica dual phase filler is silica-coated carbon black obtained by causing silica to be chemically bonded to the surface of carbon black, and is commercially available from Cabot Co., Ltd. under the trade names of CRX2000, CRX2002, and CRX2006.

The carbon-silica dual phase filler is added in an amount of 1 to 100 parts by mass, and preferably 5 to 95 parts by mass per 100 parts by mass of the rubber component.

In the present invention, carbon-silica dual-phase-filler can be used in combination with other fillers. Fillers which can be used include, but are not limited to, carbon black, silica, calcium carbonate, and magnesium carbonate. Of these, carbon black and silica are preferable. These fillers which may be used together with the carbon-silica dual phase filler are added preferably in an amount of 3 to 100 parts by mass, and particularly preferably 5 to 95 parts by mass per 100 parts by mass of the total amount of the rubber component.

There are no particular limitations to the method of kneading the rubber composition obtained using the copolymer rubber of the present invention. When silica is used as the filler, the following kneading method may be used to ensure reinforcing by silica and promote the properties of the vulcanized rubber.

As the method for kneading the rubber composition comprising the copolymer rubber of the present invention, silica, a silane coupling agent, zinc oxide, and a vulcanizing agent, a method of adding silica to the copolymer rubber and kneading the mixture to obtain a first rubber composition, adding a silane coupling agent to the first rubber composition and kneading the mixture to obtain a second rubber composition, and adding zinc oxide and a vulcanizing agent to the second rubber composition and kneading the mixture can be given. Alternatively, a method of adding silica to the copolymer rubber and kneading the mixture to obtain a first rubber composition, adding the silane coupling agent to the first rubber composition and kneading the mixture, and further adding zinc oxide and kneading the mixture to obtain a second rubber composition, and adding the vulcanizing agent to the second rubber composition and kneading the mixture may be used.

If the above kneading methods are used, since the copolymer rubber and silica are kneaded in the absence of a silane coupling agent, the kneading temperature can be increased to about 170 to 180° C. Therefore, silica can be sufficiently dispersed in a smaller number of kneading operations.

A vulcanizing agent may be added to the rubber composition of the present invention in an amount of preferably 0.5 to 10 parts by mass, and more preferably 1 to 6 parts by mass per 100 parts by mass of the total rubber component.

As examples of the vulcanizing agent, sulfur, a sulfur-containing compound, a peroxide, and the like can be given.

A sulfeneamide vulcanization accelerator, a guanidine vulcanization accelerator, a thiuram vulcanization accelerator, or the like may be used in combination with the vulcanizing agent in an appropriate amount. Hydrozincite, vulcanization auxiliaries, aging preventives, processing aids, or the like may be added in an appropriate amount.

There are no particular limitations to the additives to the rubber composition obtained using the copolymer rubber of the present invention. The following compatibilizers may be added during kneading in order to further improve processability during the kneading operation or to promote balance among the wet skid properties, low hysteresis loss properties, and abrasion resistance.

An organic compound selected from the group consisting of epoxy group-containing compounds, carboxylic acid compounds, carboxylate compounds, ketone compounds, ether compounds, aldehyde compounds, hydroxyl group-containing compounds, and amino group-containing compounds or a silicone compound selected from the group consisting of alkoxysilane compounds, siloxane compounds, and aminosilane compounds is preferably used as the compatibilizer.

Specific examples of the compatibilizers include epoxy group-containing compounds such as butyl glycidyl ether, diglycidyl ether, propylene oxide, neopentyl glycol diglycidyl ether, epoxy resin, epoxidized soybean oil, and an epoxidized fatty acid ester; carboxylic acid compounds such as adipic acid, octyl acid, and methacrylic acid; carboxylate compounds such as acrylic ester, diethylene acrylate, ethyl methacrylate, ortho acetate, ethyl acetoacetate, butyl acetate, isopropyl acetate, dimethyl carbonate, p-hydroxyphenyl acetate, polyester plasticizer, and stearic acid plasticizer; ketones such as methyl cyclohexanone and acetylacetone; ethers such as isopropyl ether and dibutyl ether; aldehydes such as undecylene aldehyde, decyl aldehyde, vanillin, 3,4-dimethoxybenzaldehyde, and cumin aldehyde; amino group-containing compounds such as isopropylamine, diisopropylamine, triethylamine, 3-ethoxypropylamine, 2-ethylhexylamine, isopropanolamine, N-ethylethylenediamine, ethyleneimine, hexamethylenediamine, 3-laurylyoxypropylamine, aminophenol, aniline, 3-isopropoxyaniline, phenylenediamine, aminopyridine, N-methyldiethanolamine, N-methylethanolamine, 3-amino-1-propanol, ethylamine hydrochloride, and n-butylamine hydrochloride;

and hydroxyl group-containing compounds such as isopropyl alcohol, butanol, octanol, octanediol, ethylene glycol, methylcyclohexanol, 2-mercaptoethanol, 3-methyl-3-methoxy-1-butanol, 3-methyl-1,5-pentanediol, 1-octadecanol, diethylene glycol, butylene glycol, dibutylene glycol, and triethylene glycol.

Of these, the epoxy group-containing compounds, the amino group-containing compounds, and the hydroxyl group-containing compounds are preferable.

Specific examples of the silicone compatibilizers include alkoxysilane compounds such as trimethylmethoxysilane, trimethylethoxysilane, dimethyldimethoxysilane, methyltriethoxysilane, methyltriphenoxysilane, tetraethoxysilane, methyldiethoxysilane, and vinyltrimethoxysilane; siloxane compounds such as dimethylsiloxane oligomer, silicone oil, amino-modified silicone oil, epoxy-modified silicone oil, carboxyl-modified silicone oil, polyether-modified silicone oil, alkyl-modified silicone oil, higher fatty acid ester-modified silicone oil, higher alkoxy-modified silicone oil, and higher fatty acid containing silicone oil; and aminosilane compounds such as hexamethyldisilazane, nonamethyltrisilazane, anilitrimethylsilane, bis(dimethylamino)dimethylsilane, bis(diethylamino)dimethylsilane, and triethylaminosilane.

Among these, the silazane compounds and bis(dimethylamino)dimethylsilane are preferable.

EXAMPLES

The present invention will now be described in more detail by way of examples, which should not be construed as limiting the present invention. In the examples, "%" and "parts" respectively refer to "mass %" and "parts by mass".

In the following Examples and Comparative Examples, properties were measured using the following methods.
(1) Bonded styrene content
  The bonded styrene content was measured by 270 MHz $^1$H-NMR.
(2) Vinyl content of conjugated diolefin
  The vinyl content of conjugated diolefin was measured by 270 MHz $^1$H-NMR.
(3) Content of styrene single block having one styrene unit and styrene micro block having 1 to 8 continuous styrene units
  According to the method of Tanaka et al. (Polymer, 22, 1721 (1981)), a styrene-butadiene copolymer rubber was decomposed using ozone and analyzed by gel permeation chromatography (GPC).
(4) Temperature difference between inflection points in glass transition temperature region The glass transition temperature was measured in accordance with ASTM D3418. The temperature difference between Tf (extrapolated onset temperature; ° C.) and Te (extrapolated end temperature; ° C.) in the glass transition temperature region was regarded as the temperature difference between the inflection points in the glass transition temperature region.
(5) Mooney viscosity ($ML_{1+4}$, 100° C.)
  The Mooney viscosity ($ML_{1+4}$, 100° C.) was measured in accordance with JIS K 6300-1 using an L rotor (preheating time: 1 min, rotor operation time: 4 min, temperature: 100° C.).
(6) Primary amino group content (Mmol/Kg)
  After dissolving the polymer in toluene, amino-group containing compounds not bonding to the copolymer rubber were separated by precipitating the copolymer in a large amount of methanol. The residual copolymer rubber was dried and used as a sample for analyzing the total amino-group content by the total amine test method described in JIS K7237. Using the copolymer rubber sample treated as mentioned above, the content of the secondary amino group and tertiary amino group was measured by the acetylacetone blocked method. o-Nitrotoluene was used as a solvent for dissolving the sample. After the addition of acetylacetone, potentiometric titration was carried out using a perchloroacetic acid solution. The content of the secondary amino group and tertiary amino group was subtracted from the total amino group content to determine the primary amino group content (mmol). The amount of primary amino group bonded to the polymer (mmol/kg) was determined by dividing the resulting primary amino group content by the amount of the polymer used for the analysis.
(7) Tertiary amino group content (Mmol/Kg)
  After dissolving the polymer in toluene, amino-group containing compounds not bonding to the copolymer rubber were separated by precipitation in a large amount of methanol. The residual copolymer rubber was dried and used for the analysis of the tertiary amino group content by the acetylation method. A mixture of o-nitrotoluene and acetic acid was used as a solvent for dissolving the sample. After the addition of a mixture of formic acid and acetic anhydride, potentiometric titration was carried out using a perchloroacetic acid solution. The amount of the tertiary amino group bonded to the polymer (mmol/kg) was determined by dividing the resulting tertiary amino group content (mmol) by the amount of the polymer used for the analysis.
(8) Alkoxysilyl group content (Mmol/Kg)
  The alkoxysilyl group content was determined using the IR spectrum absorption of Si—C bond at 1160 cm$^{-1}$.
(9) Evaluation of properties of vulcanized rubber
  Compositions according to the formulation shown in Table 2, which were prepared using the copolymer rubber produced in the Examples and Comparative Examples, were kneaded in a 250 cc laboratory plast-mill and vulcanized at 145° C. for a prescribed period of time. Properties (a) to (d) were measured using the vulcanized rubbers.
  (a) Tensile strength: measured according to JIS K6251. The measured values were indicated by indices. The larger the value, the larger the tensile strength and the better the rubber pulling strength.
  (b) DIN abrasion index: measured according to JIS K 6264. The measured values were indicated by indices. The larger the value, the smaller the amount of abrasion and the better the abrasion resistance.
  (c) Impact resilience: measured according to JIS K6255 using a tripso impact resilience test machine at temperatures of 25° C., 50° C., and 80° C. The impact resilience at 25° C. is generally used as an index of the wet skid. The smaller the value, the better the wet skid. On the other hand, the impact resilience at 50° C. or 80° C. is used as an index of rolling resistance. The larger the value, the smaller the rolling resistance and the better the rubber for use as tires.
  (d) tan δ (70° C.): measured using a dynamic spectrometer manufactured by Rheometrix Co. (U.S.A) under the conditions of a tensile dynamic strain of 0.7% and a frequency of 15.9 Hz at 70° C. The larger the value, the smaller the hysteresis loss of the rubber composition and the larger the degree of rolling resistance reduction when the composition is used in a tire.

Example 1

Synthesis and Evaluation of Copolymer Rubber A

A 5 l autoclave reaction vessel of which the internal atmosphere was replaced with nitrogen was charged with 3000 g of cyclohexane, 30.0 g of tetrahydrofuran, 12.4 g (0.034 mmol) of potassium dodecylbenzenesulfonate, 205 g (1.97 mol) of styrene, and 145 g (2.68 mol) of 1,3-butadiene. After adjusting the temperature of the contents of the reaction vessel to 40° C., 360 mg (5.62 mmol) of n-butyllithium was added as a polymerization initiator to initiate the polymerization. Starting from the time when the polymerization temperature reached 55° C., 150 g (2.77 mol) of butadiene was continuously added over 15 minutes to continue the polymerization reaction. The maximum temperature of the content in the reaction vessel was 85° C.

When the polymerization conversion rate reached 99%, 207 mg (1.80 mmol) of methyldichlorosilane was added, and the mixture was stirred for 15 minutes. After the addition of 2,6-di-tert-butyl-p-cresol to the polymer solution which completed the reaction of 15 minutes, the solvent was removed by steam stripping. The resulting polymer was dried using a heat roller of which the temperature was controlled at 110° C. to obtain a copolymer rubber. The rubber is referred to as Copolymer Rubber A. The composition and properties of the Copolymer Rubber A are shown in Table 1.

A rubber composition prepared using the Copolymer Rubber A according to the formulation shown in Table 2 was vulcanized to evaluate various properties. The results are shown in Table 3.

Comparative Example 1

Synthesis and Evaluation of Copolymer Rubber B

A 5l autoclave reaction vessel of which the internal atmosphere was replaced with nitrogen was charged with 3000 g of cyclohexane, 30.0 g of tetrahydrofuran, 200 g (1.92 mol) of styrene, and 150 g (2.77 mol) of 1,3-butadiene. After adjusting the temperature of the contents of the reaction vessel to 40° C., 360 mg (5.62 mmol) of n-butyllithium was added as a polymerization initiator to initiate the polymerization. Starting from the time when the polymerization temperature reached 68° C., 150 g (2.77 mol) of butadiene was continuously added over 10 minutes to continue the polymerization. The maximum temperature of the content in the reaction vessel was 80° C.

When the polymerization conversion rate reached 99%, 207 mg (1.80 mmol) of methyldichlorosilane was added, and the mixture was stirred for 15 minutes. After the reaction, 2,6-di-tert-butyl-p-cresol was added to the resulting polymer solution and the solvent was removed by steam stripping. The resulting polymer was dried using a heat roller of which the temperature was controlled at 110° C. to obtain a copolymer rubber. The rubber is referred to as Copolymer Rubber B. The composition and properties of the Copolymer Rubber B are shown in Table 1.

A rubber composition prepared using the Copolymer Rubber B according to the formulation shown in Table 2 was vulcanized to evaluate various properties. The results are shown in Table 3.

Comparative Example 2

Synthesis and Evaluation of Copolymer Rubber C

A 5l autoclave reaction vessel of which the internal atmosphere was replaced with nitrogen was charged with 3000 g of cyclohexane, 27.0 g of tetrahydrofuran, 0.05 g (0.137 mmol) of potassium dodecylbenzenesulfonate, 205 g (1.97 mol) of styrene, and 220 g (4.07 mol) of 1,3-butadiene. After adjusting the temperature of the contents of the reaction vessel to 40° C., 360 mg (5.62 mmol) of n-butyllithium was added to initiate the polymerization.

Starting from the time when the polymerization temperature reached 55° C., 75 g (1.39 mol) of butadiene was continuously added over 10 minutes to continue the polymerization. The maximum temperature of the content in the reaction vessel was 83° C. When the polymerization conversion rate reached 99%, 207 mg of methyldichlorosilane was added and the mixture was reacted for 15 minutes. After the reaction, 2,6-di-tert-butyl-p-cresol was added to the resulting polymer solution and the solvent was removed by steam stripping. The resulting polymer was dried using a heat roller of which the temperature was controlled at 110° C. to obtain a copolymer rubber. The rubber is referred to as Copolymer Rubber C. The composition and properties of the Copolymer Rubber C are shown in Table 1.

A rubber composition prepared using the Copolymer Rubber C according to the formulation shown in Table 2 was vulcanized to evaluate various properties. The results are shown in Table 3.

Comparative Example 3

Synthesis and Evaluation of Copolymer Rubber D

A 5l autoclave reaction vessel of which the internal atmosphere was replaced with nitrogen was charged with 3000 g of cyclohexane, 57.0 g of tetrahydrofuran, 205 g (1.97 mol) of styrene, and 245 g (4.53 mol) of 1,3-butadiene. After adjusting the temperature of the contents of the reaction vessel to 30° C., 360 mg (5.62 mmol) of n-butyllithium was added to initiate the polymerization. Starting from the time when the polymerization temperature reached 70° C., 50 g (0.92 mol) of butadiene was continuously added over 10 minutes to continue the polymerization. The maximum temperature of the content in the reaction vessel was 85° C.

When the polymerization conversion rate reached 99%, 207 mg of methyldichlorosilane was added and the mixture was reacted for 15 minutes. After the reaction, 2,6-di-tert-butyl-p-cresol was added to the resulting polymer solution and the solvent was removed by steam stripping. The resulting polymer was dried using a heat roller of which the temperature was controlled at 110° C. to obtain a copolymer rubber. The rubber is referred to as Copolymer Rubber D. The composition and properties of the Copolymer Rubber D are shown in Table 1.

A rubber composition prepared using the Copolymer Rubber D according to the formulation shown in Table 2 was vulcanized to evaluate various properties. The results are shown in Table 3.

Example 2

Synthesis and Evaluation of Copolymer Rubber E

Copolymer Rubber E was obtained in the same manner as in Example 1, except that 431 mg (5.06 mmol) of piperidine was added as a secondary amine to introduce a tertiary amino group into the polymerization initiation terminals at an early stage of the polymerization, and 1.799 g (5.06 mmol) of N,N-bis(trimethylsilyl)aminopropylmethyldimethoxysilane was added instead of 207 mg of methyl dichloro silane as a terminal modifier at the time when the polymerization conversion rate reached 99%. The composition and properties of the Copolymer Rubber E are shown in Table 1. A rubber composition prepared using the Copolymer Rubber E according to the formulation shown in Table 2 was vulcanized to evaluate various properties. The results are shown in Table 3.

Example 3

Synthesis and Evaluation of Copolymer Rubber F

Copolymer Rubber F was obtained in the same manner as in Example 1, except that 1.799 g of N,N-bis(trimethylsilyl)

aminopropylmethyldimethoxysilane was used instead of 207 mg of methyldichlorosilane as a terminal modifier at the time when the polymerization conversion rate reached 99%. The composition and properties of the Copolymer Rubber F are shown in Table 1.

A rubber composition prepared using the Copolymer Rubber F according to the formulation shown in Table 2 was vulcanized to evaluate various properties. The results are shown in Table 3.

Example 4

Synthesis and Evaluation of Copolymer Rubber G

Copolymer Rubber G was obtained in the same manner as in Example 1, except that 431 mg of piperidine was added as a secondary amine at an early stage of the polymerization in order to introduce a tertiary amino group into the polymerization initiation terminals. The composition and properties of the Copolymer Rubber G are shown in Table 1.

A rubber composition prepared using the Copolymer Rubber G according to the formulation shown in Table 2 was vulcanized to evaluate various properties. The results are shown in Table 3.

Comparative Example 4

Synthesis and Evaluation of Copolymer Rubber H

Copolymer Rubber H was obtained in the same manner as in Example 1, except that 431 mg of piperidine was added as a secondary amine at an early stage of the polymerization in order to introduce a tertiary amino group into the polymerization initiation terminals and 1.799 g of N,N-bis(trimethylsilyl)aminopropylmethyldimethoxysilane was used instead of 207 mg of methyldichlorosilane as a terminal modifier at the time when the polymerization conversion rate reached 99%. The composition and properties of the Copolymer Rubber H are shown in Table 1.

A rubber composition prepared using the Copolymer Rubber H according to the formulation shown in Table 2 was vulcanized to evaluate various properties. The results are shown in Table 3.

TABLE 1

|  | Example 1 | Comparative Example 1 | Comparative Example 2 | Comparative Example 3 | Example 2 | Example 3 | Example 4 | Comparative Example 4 |
|---|---|---|---|---|---|---|---|---|
| Vinyl content (wt %) | 45 | 45 | 45 | 45 | 44 | 45 | 45 | 48 |
| Bonded styrene content (wt %) | 41 | 41 | 41 | 41 | 41 | 41 | 41 | 41 |
| ST single block (wt %) | 35 | 62 | 31 | 67 | 36 | 34 | 33 | 65 |
| ST m.b. (wt %) | 60 | 36 | 63 | 30 | 60 | 61 | 62 | 33 |
| ST long block (wt %) | 5 | 2 | 6 | 3 | 4 | 5 | 5 | 2 |
| ΔTg (° C.) | 35 | 30 | 22 | 15 | 46 | 35 | 35 | 14 |
| Primary amino group content * | 0 | 0 | 0 | 0 | 8.1 | 8.6 | 0 | 8.2 |
| Tertiary amino group content * | 0 | 0 | 0 | 0 | 9.2 | 0 | 9.6 | 9.0 |
| SiOR group content * | 0 | 0 | 0 | 0 | 7.3 | 7.7 | 0 | 7.2 |

Note 1:
"ST m.b." indicates a styrene micro block with continuously linked 2 to 7 styrene units, and "ST long block" indicates a polymer unit with 8 or more styrene units.

Note 2:
The unit of the asterisked content is "mmol/kg · polymer".

TABLE 2

| Components | (phr) |
|---|---|
| Copolymer rubber | 70 |
| Extender oil *1) | 22 |
| Natural rubber | 30 |
| Carbon black *2) | 46 |
| Silica *3) | 45 |
| Silane coupling agent *4) | 4 |
| Stearic acid | 1 |
| Antioxidant *5) | 2 |
| Zinc oxide | 2.5 |
| Vulcanization accelerator DPG *6) | 1 |
| Vulcanization accelerator CZ *7) | 1.9 |
| Sulfur | 1.8 |

*1) T-DAE (treated distillate aromatic extract; manufactured by Fuji Kosan Co., Ltd.) having the following properties was used. Specific gravity: 0.9594, flash point: 279° C., kinematic viscosity (100° C., cSt): 24.77 mm$^2$/sec., pour point: 14.3° C., total acid value: 0.59 mgKOH/g, refractive index (20° C.): 1.5351, V.G.C.: 0.8971, R.I. $C_A$: 28.4%, $C_N$: 29.6%, $C_P$: 42.0%
*2) "Diablack N339" manufactured by Mitsubishi Chemical Co., Ltd.
*3) "Nipseal VN3" manufactured by Tosoh Silica Corporation
*4) "Si69" manufactured by Degussa AG
*5) "Nocrack" manufactured by Ohuchi Shinko Kagaku Co., Ltd.
*6) "Nockseller D" manufactured by Ohuchi Shinko Kagaku Co., Ltd.
*7) "Nockseller CZ" manufactured by Ohuchi Shinko Kagaku Co., Ltd.

TABLE 3

|  | Example 1 | Comparative Example 1 | Comparative Example 2 | Comparative Example 3 | Example 2 | Example 3 | Example 4 | Comparative Example 4 |
|---|---|---|---|---|---|---|---|---|
| Tensile strength (MPa) | 18.3 | 17.0 | 17.9 | 16.5 | 18.6 | 18.5 | 18.2 | 17.1 |
| DIN abrasion |  |  |  |  |  |  |  |  |
| Index when the value of Comparative Example 3 is 100 | 112 | 103 | 109 | 100 | 113 | 112 | 111 | 103 |
| Impact resilience |  |  |  |  |  |  |  |  |
| 25° C. (%) | 14 | 14 | 23 | 22 | 15 | 15 | 15 | 23 |
| 50° C. (%) | 37 | 37 | 39 | 38 | 41 | 41 | 38 | 44 |
| 80° C. (%) | 48 | 47 | 49 | 47 | 52 | 51 | 49 | 52 |
| 50/25° C. | 2.64 | 2.64 | 1.70 | 1.73 | 2.73 | 2.73 | 2.53 | 1.91 |
| 80/25° C. | 3.43 | 3.36 | 2.13 | 2.14 | 3.47 | 3.40 | 3.27 | 2.26 |
| tan δ (70° C.) | 0.185 | 0.184 | 0.184 | 0.183 | 0.159 | 0.166 | 0.175 | 0.159 |

It can be seen from the results shown in Table 1 that the copolymer of Example 1 contains styrene micro blocks with continuously linked 2 to 7 styrene units in an amount of 50 wt % or more of the total styrene bond and has a large temperature difference (ΔTg) between the inflection points in the glass transition temperature region of 30° C. or more. In contrast, the copolymer of Comparative Example 1 contains only a small amount (36 wt %) of the styrene micro block structure. Although the copolymer of Comparative Example 2 contains 50 wt % or more of the styrene micro block structure, its ΔTg is comparatively small (22° C.). The copolymer of Comparative Example 3 contains only 30 wt % of the styrene micro block structure and its ΔTg is significantly small (15° C.).

The copolymer of Example 2 in Table 1 was produced by introducing a tertiary amino group into the initiation terminal of the polymer chain and then introducing an alkoxysilyl group and a primary amino group into the end terminal. Similarly, the copolymer of Example 3 was produced by introducing an alkoxysilyl group and a primary amino group into the polymerization end terminal, and a tertiary amino group only into the initiation terminal of the copolymer of Example 4. The copolymer of Comparative Example 4, which was produced by introducing a tertiary amino group into the initiation terminal of the polymer chain and an alkoxysilyl group and a primary amino group into the end terminal, had 33 wt % of the styrene micro block structure and a significantly small ΔTg of 14° C.

Vulcanized rubbers were prepared according to the formulations shown in Table 2 using the copolymer rubbers having such composition and properties. The properties of the vulcanized rubbers are shown in Table 3. It can be seen from Table 3 that the vulcanized rubbers in which the copolymer rubbers of the present invention were used have a large DIN abrasion index, indicating their excellent abrasion resistance. This is mainly due to the structure of the copolymer rubber in which the styrene micro block structure with linked 2 to 7 styrene units is 50 wt % or more of the total bonded styrene.

In addition, it can be seen that all of the vulcanized rubbers in which the copolymer rubber of the present invention was used showed lower impact resilience at 25° C. as compared with vulcanized rubbers prepared using the copolymer rubbers of Comparative Examples 1 to 4, suggesting outstanding wet skid characteristics when used in a tire. Furthermore, large ratios of the impact resilience at 25° C. to the impact resilience at 50° C. and the impact resilience at 25° C. to the impact resilience at 80° C. indicate that the vulcanized rubbers are excellent materials for tires with well-balanced wet skid characteristics and low rolling resistance. This is mainly due to the large temperature difference (ΔTg) between the inflection points in the glass transition temperature region, that is, possession of the structure in which styrene is densely distributed on one end of the copolymer chain and scarcely distributed on the other end.

Example 5

Synthesis and Evaluation of Copolymer Rubber J

A 5 l autoclave reaction vessel of which the internal atmosphere was replaced with nitrogen was charged with 3000 g of cyclohexane, 30.0 g of tetrahydrofuran, 200 g (1.92 mol) of styrene, and 150 g (2.77 mol) of 1,3-butadiene. After adjusting the temperature of the contents of the reaction vessel to 40° C., 360 mg (5.62 mmol) of n-butyllithium was added as a polymerization initiator to initiate the polymerization. Starting from the time when the polymerization temperature reached 68° C., 150 g (2.77 mol) of butadiene was continuously added over 10 minutes to continue the polymerization. The maximum temperature of the content in the reaction vessel was 80° C.

When the polymerization conversion rate reached 99%, 1.799 g (5.06 mmol) of N,N-bis(trimethylsilyl)aminopropylmethyldimethoxysilane was added, and the mixture was reacted for 15 minutes. After the addition of 2,6-di-tert-butyl-p-cresol to the polymer solution which completed the reaction of 15 minutes, the solvent was removed by steam stripping. The resulting polymer was dried using a heat roller of which the temperature was controlled at 110° C. to obtain a copolymer rubber. The rubber is referred to as Copolymer Rubber J. The composition and properties of the Copolymer Rubber J are shown in Table 4.

A rubber composition prepared using the Copolymer Rubber J according to the formulation shown in Table 2 was vulcanized to evaluate various properties. The results are shown in Table 5.

Comparative Example 5

Synthesis and Evaluation of Copolymer Rubber K

A 5 l autoclave reaction vessel of which the internal atmosphere was replaced with nitrogen was charged with 3000 g of cyclohexane, 27.0 g of tetrahydrofuran, 205 g (1.97 mol) of styrene, and 245 g (4.53 mol) of 1,3-butadiene. After adjusting the temperature of the contents of the reaction vessel to 30° C., 360 mg (5.62 mmol) of n-butyllithium was added to initiate the polymerization. Starting from the time when the polymerization temperature reached 70° C., 50 g (0.92 mol) of butadiene was continuously added over 10 minutes to continue the polymerization. The maximum temperature of the content in the reaction vessel was 85° C.

When the polymerization conversion rate reached 99%, 1.799 g (5.06 mmol) of N,N-bis(trimethylsilyl)aminopropylmethyldimethoxysilane was added, and the mixture was reacted for 15 minutes. After the reaction, 2,6-di-tert-butyl-p-cresol was added to the resulting polymer solution and the solvent was removed by steam stripping. The resulting polymer was dried using a heat roller of which the temperature was controlled at 110° C. to obtain a copolymer rubber. The rubber is referred to as Copolymer Rubber K. The composition and properties of the Copolymer Rubber K are shown in Table 4.

A rubber composition prepared using the Copolymer Rubber K according to the formulation shown in Table 2 was vulcanized to evaluate various properties. The results are shown in Table 5.

Example 6

Synthesis and Evaluation of Copolymer Rubber L

Copolymer Rubber L was obtained in the same manner as in Example 5, except that 431 mg of piperidine was added as a secondary amine at an early stage of the polymerization in order to introduce a tertiary amino group into the polymerization initiation terminals. The composition and properties of the Copolymer Rubber L are shown in Table 4. A rubber composition prepared using the Copolymer Rubber L according to the formulation shown in Table 2 was vulcanized to evaluate various properties. The results are shown in Table 5.

Comparative Example 6

Synthesis and Evaluation of Copolymer Rubber M

A 5l autoclave reaction vessel of which the internal atmosphere was replaced with nitrogen was charged with 3000 g of cyclohexane, 27.0 g of tetrahydrofuran, 0.05 g (0.137 mmol) of potassium dodecylbenzenesulfonate, 431 mg of piperidine, 205 g (1.97 mol) of styrene, and 220 g (4.07 mol) of 1,3-butadiene. After adjusting the temperature of the contents of the reaction vessel to 40° C., 360 mg (5.62 mmol) of n-butyllithium was added to initiate the polymerization.

Starting from the time when the polymerization temperature reached 55° C., 75 g (1.39 mol) of butadiene was continuously added over 10 minutes to continue the polymerization. The maximum temperature reached 83° C. When the polymerization conversion rate reached 99%, 207 mg of methyldichlorosilane was added and the mixture was reacted for 15 minutes. After the reaction, 2,6-di-tert-butyl-p-cresol was added to the resulting polymer solution and the solvent was removed by steam stripping. The resulting polymer rubber was dried using a heat roller of which the temperature was controlled at 110° C. The rubber is referred to as Copolymer Rubber M. The composition and properties of the Copolymer Rubber M are shown in Table 4.

The rubber composition prepared using the Copolymer Rubber M according to the formulation shown in Table 2 was vulcanized to evaluated the properties of vulcanized rubber. The results are shown in Table 5.

TABLE 4

| | Example 5 | Comparative Example 5 | Example 6 | Comparative Example 6 |
|---|---|---|---|---|
| Vinyl content (wt %) | 45 | 45 | 45 | 48 |
| Bonded styrene content (wt %) | 41 | 41 | 41 | 41 |
| ST single block (wt %) | 65 | 69 | 64 | 35 |
| ST m.b. (wt %) | 33 | 30 | 35 | 59 |
| ST long block (wt %) | 2 | 1 | 1 | 6 |
| ΔTg (° C.) | 30 | 14 | 30 | 20 |
| Primary amino group content * | 8.5 | 8.0 | 8.2 | 0 |
| Tertiary amino group content * | 0 | 0 | 9.6 | 9 |
| SiOR group content * | 7.5 | 7.2 | 7.4 | 0 |

Note 1:
"ST m.b." indicates a styrene micro block with continuously linked 2 to 7 styrene units, and "ST long block" indicates a polymer unit with 8 or more styrene units.
Note 2:
The unit of the asterisked content is "mmol/kg · polymer".

TABLE 5

| | Example 5 | Comparative Example 5 | Example 6 | Comparative Example 6 |
|---|---|---|---|---|
| Tensile strength (MPa) | 17.2 | 16.8 | 17.3 | 17.9 |
| DIN abrasion | | | | |
| Index when the value of Comparative Example 3 is 100 | 105 | 102 | 105 | 109 |
| Impact resilience | | | | |
| 25° C. (%) | 14 | 23 | 14 | 23 |
| 50° C. (%) | 41 | 43 | 42 | 39 |
| 80° C. (%) | 50 | 51 | 51 | 49 |
| 50/25° C. | 2.93 | 1.87 | 3.00 | 1.70 |
| 80/25° C. | 3.57 | 2.22 | 3.64 | 2.13 |
| tan δ (70° C.) | 0.166 | 0.166 | 0.158 | 0.174 |

It can be seen from the results shown in Table 4 that the copolymer of Example 5 contains a specific amount of a primary-amino group and an alkoxysilyl group and has a large temperature difference (ΔTg) between the inflection points in the glass transition temperature region of 30° C. or more. In contrast, although the copolymer of Comparative Example 5 contains a primary amino group and an alkoxysilyl group in the molecular chain, its ΔTg is 14° C. which is significantly small.

The copolymer of the Example 6 in Table 4 has a tertiary amino group introduced into the initiation terminal and a primary amino group and an alkoxysilyl group introduced into the end terminal. Its ΔTg is 20° C. which is large. The copolymer of Comparative Example 6 has a tertiary amino group introduced into the initiation terminal of the polymer chain, but does not have a primary amino group and an alkoxysilyl group at the end terminal. This copolymer had a small ΔTg of 20° C.

Vulcanized rubbers were prepared according to the formulations shown in Table 2 using the copolymer rubbers having such a composition and properties. The properties of the vulcanized rubbers are shown in Table 5. It can be seen from Table 5 that the vulcanized rubbers in which the copolymer rubbers of the present invention were used have a small tan δ at 70° C., indicating excellent low hysteresis loss properties. The products of Examples 5 and 6 have high impact resilience at 50° C. and 80° C. as compared with the products of Comparative Examples 5 and 6, indicating rolling resistance reduction when the composition is used in a tire. This is mainly due to the structure of the copolymer rubber having a specific amount of a primary amino group and an alkoxysilyl group in the molecular chain. In addition, either composition showed lower impact resilience at 25° C. as compared with the products of Comparative Examples 5 and 6, suggesting outstanding wet skid characteristics when used in a tire.

Furthermore, large ratios of the impact resilience at 25° C. to the impact resilience at 50° C. and the impact resilience at 25° C. to the impact resilience at 80° C. indicate that the vulcanized rubbers are excellent materials for tires with well-balanced wet skid characteristics and low rolling resistance. This is mainly due to the large temperature difference ($\Delta Tg$) between the inflection points in the glass transition temperature region, that is, possession of the structure in which styrene is densely distributed on one end the copolymer chain and scarcely distributed on the other end.

Example 7

Synthesis and Evaluation of Copolymer Rubber N

A 5 l autoclave reaction vessel of which the internal atmosphere was replaced with nitrogen was charged with 3000 g of cyclohexane, 30.0 g of tetrahydrofuran, 431 mg of piperidine, 200 g (1.92 mol) of styrene, and 150 g (2.77 mol) of 1,3-butadiene. After adjusting the temperature of the contents of the reaction vessel to 40° C., 360 mg (5.62 mmol) of n-butyllithium was added as a polymerization initiator to initiate polymerization. Starting from the time when the polymerization temperature reached 68° C., 150 g (2.77 mol) of butadiene was continuously added over 10 minutes to continue the polymerization. The maximum temperature of the content in the reaction vessel was 80° C.

When the polymerization conversion rate reached 99%, 207 mg (1.80 mmol) of methyldichlorosilane was added, and the mixture was reacted for 15 minutes. After the addition of 2,6-di-tert-butyl-p-cresol to the polymer solution which completed the reaction of 15 minutes, the solvent was removed by steam stripping. The resulting polymer was dried using a heat roller of which the temperature was controlled at 110° C. to obtain a copolymer rubber. The rubber is referred to as Copolymer Rubber N. The composition and properties of the Copolymer Rubber N are shown in Table 6.

A rubber composition prepared from the Copolymer Rubber N according to the formulation shown in Table 2 was vulcanized to evaluate various properties. The results are shown in Table 7.

Comparative Example 7

Synthesis and Evaluation of Copolymer Rubber P

A 5 l autoclave reaction vessel of which the internal atmosphere was replaced with nitrogen was charged with 3000 g of cyclohexane, 57.0 g of tetrahydrofuran, 431 mg of piperidine, 205 g (1.97 mol) of styrene, and 245 g (4.53 mol) of 1,3-butadiene. After adjusting the temperature of the contents of the reaction vessel to 30° C., 360 mg (5.62 mmol) of n-butyllithium was added as a polymerization initiator to initiate polymerization. Starting from the time when the polymerization temperature reached 70° C., 50 g (0.92 mol) of butadiene was continuously added over 10 minutes to continue the polymerization. The maximum temperature of the content in the reaction vessel was 85° C.

When the polymerization conversion rate reached 99%, 207 mg (1.80 mmol) of methyldichlorosilane was added, and the mixture was reacted for 15 minutes. After the addition of 2,6-di-tert-butyl-p-cresol to the polymer solution which completed the reaction of 15 minutes, the solvent was removed by steam stripping. The resulting polymer was dried using a heat roller of which the temperature was controlled at 110° C. to obtain a copolymer rubber. The rubber is referred to as Copolymer Rubber P. The composition and properties of the Copolymer Rubber P are shown in Table 6.

A rubber composition prepared from the Copolymer Rubber P according to the formulation shown in Table 2 was vulcanized to evaluate various properties. The results are shown in Table 7.

Comparative Example 8

Synthesis and Evaluation of Copolymer Rubber Q

A 5 l autoclave reaction vessel of which the internal atmosphere was replaced with nitrogen was charged with 3000 g of cyclohexane, 27.0 g of tetrahydrofuran, 0.05 g (0.137 mmol) of potassium dodecylbenzenesulfonate, 205 g (1.97 mol) of styrene, and 220 g (4.07 mol) of 1,3-butadiene. After adjusting the temperature of the contents of the reaction vessel to 40° C., 360 mg (5.62 mmol) of n-butyllithium was added to initiate the polymerization. Starting from the time when the polymerization temperature reached 55° C., 75 g (1.39 mol) of butadiene was continuously added over 10 minutes to continue the polymerization. The maximum temperature reached 83° C. When the polymerization conversion rate reached 99%, 1.799 g (5.06 mmol) of N,N-bis(trimethylsilyl) aminopropylmethyldimethoxysilane was added, and the mixture was reacted for 15 minutes. After the reaction, 2,6-di-tert-butyl-p-cresol was added to the resulting polymer solution and the solvent was removed by steam stripping. The resulting copolymer rubber was dried using a heat roller of which the temperature was controlled at 110° C. The rubber is referred to as Copolymer Rubber Q. The composition and properties of the Copolymer Rubber Q are shown in Table 6.

The rubber composition prepared using the Copolymer Rubber Q according to the formulation shown in Table 2 was vulcanized to evaluate the properties of vulcanized rubber. The results are shown in Table 7.

TABLE 6

|  | Example 7 | Comparative Example 7 | Comparative Example 8 |
| --- | --- | --- | --- |
| Vinyl content (wt %) | 45 | 45 | 48 |
| Bonded styrene content (wt %) | 41 | 41 | 41 |
| ST single block (wt %) | 66 | 65 | 38 |
| ST m.b. (wt %) | 32 | 34 | 58 |
| ST long block (wt %) | 2 | 1 | 4 |
| $\Delta Tg$ (° C.) | 32 | 15 | 22 |
| Primary amino group content * | 0 | 0 | 8 |
| Tertiary amino group content * | 9.5 | 9.0 | 9 |
| SiOR group content * | 0 | 0 | 7.4 |

Note 1:
"ST m.b." indicates a styrene micro block with continuously linked 2 to 7 styrene units, and "ST long block" indicates a polymer unit with 8 or more styrene units.
Note 2:
The unit of the asterisked content is "mmol/kg · polymer".

TABLE 7

| | Example 7 | Comparative Example 7 | Comparative Example 8 |
|---|---|---|---|
| Tensile strength (MPa) DIN abrasion | 17.1 | 16.6 | 18.0 |
| Index when the value of Comparative Example 3 is 100 Impact resilience | 104 | 101 | 109 |
| 25° C. (%) | 14 | 22 | 24 |
| 50° C. (%) | 39 | 40 | 42 |
| 80° C. (%) | 49 | 49 | 52 |
| 50/25° C. | 2.79 | 1.82 | 1.75 |
| 80/25° C. | 3.50 | 2.23 | 2.17 |
| tan δ (70° C.) | 0.175 | 0.174 | 0.166 |

It can be seen from the results shown in Table 6 that the copolymer rubber of Example 7 contains a specific amount of a tertiary amino group and has a large temperature difference (ΔTg) between the inflection points in the glass transition temperature region of 32° C. or more. In contrast, although the copolymer of Comparative Example 7 contains a specific amount of a tertiary amino group in the molecular chain, its ΔTg is 15° C. which is significantly small. The copolymer of Comparative Example 8 has a tertiary amino group introduced into the initiation terminal of the polymer chain, but has a small ΔTg of 22° C.

Vulcanized rubbers were prepared according to the formulations shown in Table 2 using the copolymer rubbers having such a composition and properties. The properties of the vulcanized rubbers are shown in Table 7. It can be seen from Table 7 that the vulcanized rubbers in which the copolymer rubber of Example 7 was used has a small tan δ at 70° C., indicating excellent low hysteresis loss properties. The product of Example 7 has high impact resilience at 50° C. and 80° C. as compared with the products of Comparative Examples 7 and 8, indicating well-balanced rolling resistance reduction and wet skid resistance improvement when the composition is used in a tire. This is mainly due to the structure of the copolymer rubber having a specific amount of a tertiary amino group in the molecular chain.

In addition, either composition showed lower impact resilience at 25° C. as compared with the products of Comparative Examples 7 and 8, suggesting outstanding wet skid characteristics when used in a tire. Furthermore, large ratios of the impact resilience at 25° C. to the impact resilience at 50° C. and the impact resilience at 25° C. to the impact resilience at 80° C. indicate that the vulcanized rubbers are excellent materials for tires with well-balanced wet skid characteristics and low rolling resistance. This is mainly due to the large temperature difference (ΔTg) between the inflection points in the glass transition temperature region, that is, possession of the structure in which styrene is densely distributed on one end the copolymer chain and scarcely distributed on the other end.

INDUSTRIAL APPLICABILITY

The conjugated diolefin copolymer rubber of the present invention has improved low hysteresis loss properties, abrasion resistance, and rupture characteristics, without impairing wet skid characteristics. Its road grip characteristics are improved. The copolymer rubber is suitably used as a rubber for tires, particularly as a material for tire treads.

The invention claimed is:

1. A conjugated diolefin copolymer rubber comprising a conjugated diolefin and an aromatic vinyl compound, the conjugated diolefin copolymer rubber
    (1) having a primary amino group and an alkoxysilyl group bonded to the copolymer chain, and
    (2) containing a polymerization unit of the aromatic vinyl compound in an amount of 5 to 60 wt %, wherein
    (3) the aromatic vinyl compound is distributed densely in one terminal of the copolymer chain and scarcely distributed in the other terminal, and the conjugated diolefin copolymer rubber
    (4) has a temperature difference (ΔTg) between the inflection points in the glass transition temperature region of the endothermic curve determined by a differential scanning calorimeter (DSC) of 25° C. or more.

2. The conjugated diolefin copolymer rubber according to claim 1, wherein an amount of aromatic vinyl compound single blocks having one polymerization unit of the aromatic vinyl compound is below 40 mass % of the total amount of the bonded aromatic vinyl compound, and an amount of aromatic vinyl compound micro blocks having 2 to 7 polymerization units of the aromatic vinyl compound is 50 mass % or more of the total amount of the bonded aromatic vinyl compound.

3. The conjugated diolefin copolymer rubber according to claim 1, obtained by copolymerization of the conjugated diolefin and the aromatic vinyl compound in the presence of an organic compound containing nitrogen as a hetero atom as an initiator.

4. The conjugated diolefin copolymer rubber according to claim 1, wherein the content of the primary amino group is 0.5 to 200 mmol/kg·polymer, and the content of the alkoxysilyl group is 0.5 to 200 mmol/kg·polymer.

5. The conjugated diolefin copolymer rubber according to claim 1, wherein the temperature difference (ΔTg) between the inflection points in the glass transition temperature region is 30° C. or more.

6. The conjugated diolefin copolymer rubber according to claim 1, wherein the conjugated diolefin copolymer rubber is represented by formula (1),

wherein P represents a copolymer chain of the conjugated diolefin and the aromatic vinyl compound, $R^1$ represents an alkylene group having 1 to 12 carbon atoms, $R^2$ and $R^3$ individually represent an alkyl group having 1 to 20 carbon atoms or an aryl group, n is 1 or 2, m is 1 or 2, and k is 1 or 2, provided that n+m+k is 3 or 4, or is represented by formula (2),

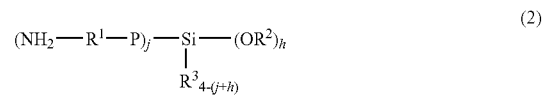

wherein P, $R^1$, $R^2$, and $R^3$ have the same meanings as defined for the formula (1), j is an integer from 1 to 3, and h is an integer from 1 to 3, provided that j+h is an integer from 2 to 4.

7. A method for producing the conjugated diolefin copolymer rubber according to claim 1, wherein the method comprises:
copolymerizing a monomer composition comprising the conjugated diolefin and the aromatic vinyl compound in a reaction medium comprising:
a hydrocarbon solvent;
a Lewis base;
an initiator that is at least one compound selected from the group consisting of an organic alkali metal compound, an organic alkaline earth metal compound, and a lithium amide compound; and
a potassium compound,
wherein a molar ratio of the aromatic vinyl compound to the conjugated diolefin is 0.5 or more, and wherein said copolymerizing is carried out in the presence of an excess amount of the aromatic vinyl compound at an early stage of the copolymerization reaction.

8. The method according to claim 7, comprising reacting the polymerization active terminal obtained by polymerization with at least one amino group-containing alkoxysilane compound represented by formula (3),

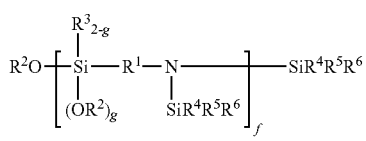
(3)

wherein $R^1$ represents an alkylene group having 1 to 12 carbon atoms, $R^2$ and $R^3$ individually represent an alkyl group having 1 to 20 carbon atoms or an aryl group, $R^4$, $R^5$, and $R^6$ individually represent an alkyl group having 1 to 20 carbon atoms or an aryl group or two of $R^4$, $R^5$, and $R^6$ may bond to form a ring together with the silicon atom to which $R^4$, $R^5$, and $R^6$ bond, g is 1 or 2, and f is an integer from 1 to 10, or represented by formula (4),

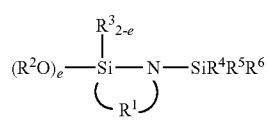
(4)

wherein $R^1$ represents an alkylene group having 1 to 12 carbon atoms, $R^2$ and $R^3$ individually represent an alkyl group having 1 to 20 carbon atoms or an aryl group, $R^4$, $R^5$, and $R^6$ have the same meanings as defined for the formula (3), and e is 1 or 2, and hydrolyzing the resulting polymer.

9. The method according to claim 8, wherein the amino group-containing alkoxysilane compound is
N,N-bis(trimethylsilyl)aminopropylmethyldimethoxysilane,
N,N-bis(trimethylsilyl)aminopropylmethyldiethoxysilane, or
1-trimethylsilyl-2,2-dimethoxy-1-aza-2-silacyclopentane.

10. The method according to claim 7, wherein said copolymerizing comprises:
anionically polymerizing the conjugated diolefin and the aromatic vinyl compound in the reaction medium, wherein the initiator is at least one lithium amide compound represented by formula (5),

$(R^4R^5R^6Si)_2$—N—$R^1$—Li (5)

wherein $R^1$ represents an alkylene group having 1 to 12 carbon atoms, and $R^4$, $R^5$, and $R^6$ individually represent an alkyl group having 1 to 20 carbon atoms or an aryl group or two of $R^4$, $R^5$, and $R^6$ may bond to form a ring together with the silicon atom to which $R^4$, $R^5$, and $R^6$ bond, or represented by formula (6),

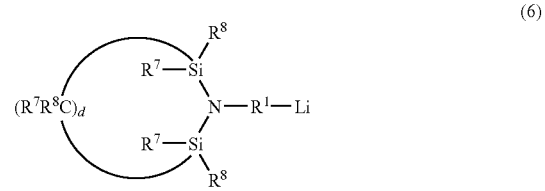
(6)

wherein $R^1$ represents an alkylene group having 1 to 12 carbon atoms, $R^7$ and $R^8$ individually represent a hydrogen atom, an alkyl group having 1 to 20 carbon atoms, or an aryl group, and d is an integer from 1 to 7; and
reacting the resulting polymerization active terminal with an alkoxysilane compound represented by formula (7),

(7)

wherein $R^2$ and $R^3$ individually represent an alkyl group having 1 to 20 carbon atoms or an aryl group, X is a halogen atom, c is an integer from 0 to 2, and b is an integer from 1 to 4, provided that c+b is an integer from 2 to 4.

11. The method according to claim 7, wherein the conjugated diolefin in an amount of 30 mol % or more, based on a total monomer content in the monomer composition, is added at a later stage of the polymerization reaction.

12. The method according to claim 7, wherein the potassium compound is a compound selected from the group consisting of a potassium organic sulfonate, a potassium organic carboxylate, a potassium alkoxide, a potassium phenoxide, and a potassium salt of an organic phosphate.

13. The method according to claim 7, wherein the potassium compound is present in an amount of 0.01 to 0.5 mol per 1 g atom of the initiator selected from the group consisting of an organic alkali metal, an organic alkaline earth metal, and a lithium amide.

14. An oil-extended copolymer rubber comprising 100 parts by mass of the conjugated diolefin copolymer rubber according to claim 1, and 10 to 100 parts by mass of an extender oil.

15. A rubber composition comprising 100 parts by mass of a rubber component and 20 to 120 parts by mass of a filler, the rubber component including 30 wt % or more of the conjugated diolefin copolymer rubber according to claim 1.

16. The rubber composition according to claim 15, wherein at least one part by mass of the filler is silica, and the rubber composition further comprises 0.5 to 20 parts by weight of a silane coupling agent per 100 parts by mass of the silica.

17. A tire comprising the rubber composition according to claim 15 as a tread component.

18. A tire comprising the rubber composition according to claim 16 as a tread component.

19. A conjugated diolefin copolymer rubber comprising a conjugated diolefin and an aromatic vinyl compound, wherein the conjugated diolefin copolymer rubber:
- has a primary amino group and an alkoxysilyl group bonded to the copolymer chain;
- has a temperature difference (ΔTg) between the inflection points in the glass transition temperature region of the endothermic curve determined by a differential scanning calorimeter (DSC) of 25° C. or more; and
- comprises a polymerization unit of the aromatic vinyl compound in an amount of 5 to 60 wt %, wherein the aromatic vinyl compound is distributed densely in one terminal of the copolymer chain and scarcely distributed in the other terminal, and
- wherein the conjugated diolefin copolymer rubber is produced by a process comprising:
- copolymerizing a monomer composition comprising the conjugated diolefin and the aromatic vinyl compound in a reaction medium comprising:
  - a hydrocarbon solvent;
  - a Lewis base;
  - an initiator that is at least one compound selected from the group consisting of an organic alkali metal compound, an organic alkaline earth metal compound, and a lithium amide compound; and
  - a potassium compound,
- wherein a molar ratio of the aromatic vinyl compound to the conjugated diolefin is 0.5 or more, and wherein said copolymerizing is carried out in the presence of an excess amount of the aromatic vinyl compound at an early stage of the copolymerization reaction.

20. The conjugated diolefin copolymer rubber according to claim 19, wherein the process further comprises adding the conjugated diolefin in an amount of 30 mol % or more, based on a total monomer content in the monomer composition, at a later stage of the copolymerization reaction.

* * * * *